(12) United States Patent
Gauvin

(10) Patent No.: US 7,735,116 B1
(45) Date of Patent: Jun. 8, 2010

(54) SYSTEM AND METHOD FOR UNIFIED THREAT MANAGEMENT WITH A RELATIONAL RULES METHODOLOGY

(75) Inventor: William Gauvin, Leominster, MA (US)

(73) Assignee: Symantec Corporation, Mountain View, CA (US)

( * ) Notice: Subject to any disclaimer, the term of this patent is extended or adjusted under 35 U.S.C. 154(b) by 1111 days.

(21) Appl. No.: 11/277,429

(22) Filed: Mar. 24, 2006

(51) Int. Cl.
*H04L 9/32* (2006.01)
*H04L 9/00* (2006.01)
*G06F 17/00* (2006.01)

(52) U.S. Cl. .................. 726/2; 726/3; 726/12; 713/153; 713/166

(58) Field of Classification Search .................. 713/166, 713/150–154, 160; 709/230; 380/277; 705/7; 726/2–3, 11–14
See application file for complete search history.

(56) References Cited

U.S. PATENT DOCUMENTS

| | | | |
|---|---|---|---|
| 2002/0048369 A1* | 4/2002 | Ginter et al. ................ 380/277 |
| 2002/0169884 A1* | 11/2002 | Jean et al. ................... 709/230 |
| 2004/0064351 A1* | 4/2004 | Mikurak ........................ 705/7 |
| 2004/0255117 A1* | 12/2004 | Paatero et al. ............... 713/166 |
| 2006/0143448 A1* | 6/2006 | Moroney ..................... 713/166 |

* cited by examiner

Primary Examiner—Hosuk Song
(74) Attorney, Agent, or Firm—Gunnison, McKay & Hodgson, L.L.P.; Forrest Gunnison

(57) ABSTRACT

A unified threat management system is provided with a uniform relational rules model. The unified relational rules model provides for the sub-setting of rules and the ability to derive a result based partially from previous security measurements. The sharing of a security check from one security implementation to another using an object-oriented methodology is facilitated. Security policy is divided into specific security features that result in a security hierarchy. The security features may be considered to be listed sequentially, from bottom to top, and form a relationship with one another. These relationships are used to build a current security measure upon a previous security measure and may be used as a pre-cursor when marshalling data content to be validated.

19 Claims, 19 Drawing Sheets

SYSTEM AND METHOD FOR UNIFIED THREAT MANAGEMENT WITH A RELATIONAL RULES METHODOLOGY

FIELD OF THE INVENTION

The present invention is directed to securing a network by providing a hierarchical unified relational rules model that facilitates sharing of a security check from one security implementation to another using an object-oriented methodology.

BACKGROUND OF THE INVENTION

In this day and age, due to the proliferation of computer software viruses, including spyware and other malicious types of code, Information Technology (IT) security has become far more complex than preventing just e-mail spam. With the recent and frequent outbreaks of phishing, pharming and spyware attacks, the setting up of various forms of network system defenses is becoming mandatory. These defenses include anti-virus software, anti-spam software, firewalls (both software and hardware), defenses against Denial-of-Service (DOS) attacks, anti-phishing technology, etc. As new types of threats are identified, new defenses are created and implemented. These include implementing products available from Symantec Corporation of Cupertino, Calif.

Historically, for each threat there was a corresponding defense. Over the years, however, this has led to a "jumble" of separate programs or appliances that are necessarily deployed on a system. Having multiple defense systems leads to complexity and redundancy as there is an overlap of security features.

Initially, firewalls were provided to defend a network against hackers. As viruses became more prevalent, an Anti Virus Gateway was provided to scan for viruses, then web content filtering, and then spam filtering. As a result, multiple devices that were costly to administer and consumed valuable rack space began appearing in IT administrators' data centers.

Enterprise firewalls became more robust due to the hardware on which the application is installed and, thus, it was easy to add "off box" functions right into the firewall. Firewalls became "Firewall Appliances." IT administrators would rather administer a Firewall Appliance that integrates Anti Virus, Content Filtering, Intrusion Detection and Spam Filtering, than administer multiple systems that perform these functions.

Unified Threat Management (UTM) is the name given to this trend in the firewall appliance security market. A UTM appliance consolidates a wide variety of gateway security functions into one box in contrast to the traditional solution of having different security functions on dedicated appliances. A UTM appliance not only guards against intrusion but performs content filtering, spam filtering, intrusion detection and anti virus duties.

UTM appliances have several benefits including operating multiple defenses through a single administrative interface without the burden of running multiple servers. In addition, only one vendor need be dealt with if adjustments, such as upgrading, are needed. A UTM appliance may offer a lower cost of ownership than traditional solutions.

There are, however, disadvantages to the approaches taken in the development and implementation of known UTM appliances.

SUMMARY OF THE INVENTION

In one embodiment, a method of controlling access to a networked device comprises: receiving an incoming message packet; evaluating the received message packet to determine if the received message packet is compliant with a first test, the first test corresponding to a first level of a security hierarchy; if the received packet complies with the first test, forwarding the received packet and an indication of its compliance with the first test for subsequent processing; and if the received packet does not comply with the first test, dropping the received packet whereby no further processing of the received packet is performed, whereby a received packet is rejected at the earliest possible operation in the processing of the packet.

In one embodiment, there is a computer program product for controlling access to a networked device, the computer program product comprising: program code for receiving an incoming message packet; program code for evaluating the received message packet to determine if the received message packet is compliant with a first test, the first test corresponding to a first level of a security hierarchy; program code for, if the received packet complies with the first test, forwarding the received packet and an indication of its compliance with the first test for subsequent processing; and program code for, if the received packet does not comply with the first test, dropping the received packet whereby no further processing of the received packet is performed, whereby a received packet is rejected at the earliest possible operation in the processing of the packet.

In yet another embodiment, a system for controlling access to a networked device comprises: means for receiving an incoming message packet; means for evaluating the received message packet to determine if the received message packet is compliant with a first test, the first test corresponding to a first level of a security hierarchy; means for, if the received packet complies with the first test, forwarding the received packet and an indication of its compliance with the first test for subsequent processing; and means for, if the received packet does not comply with the first test, dropping the received packet whereby no further processing of the received packet is performed, whereby a received packet is rejected at the earliest possible operation in the processing of the packet.

In another embodiment, the method further comprises: evaluating the received packet to determine if the received packet complies with a second test, the second test corresponding to a second level of the security hierarchy; if the received packet complies with the second test, forwarding the received packet and an indication of its compliance with the second test for subsequent processing; and if the received packet does not comply with the second test, dropping the received packet whereby no further processing of the received packed is performed, wherein the second level is higher than the first level in the security hierarchy, wherein the security hierarchy comprises at least one other security level between the first and second security levels.

The first level may be a lowest level in the security hierarchy.

The evaluation of the received packet according to the first test may be a function of at least one of: a source address value; a destination address value; a source port value; a destination port value; a network protocol value; an incoming interface value; an outgoing interface value; and a requested service value.

In another embodiment, a method of controlling access to a networked device comprises: receiving a plurality of incoming message packets; identifying a subset of the plurality of incoming message packets as being an attack on the networked device; determining a plurality of indicator parameters of the identified subset of attacking message packets; dynamically defining an attack defense processing rule as a function of the determined plurality of indicator parameters; and applying the attack defense processing rule to subsequently received incoming message packets to fend off the identified attack.

Another embodiment is a computer program product for controlling access to a networked device, the computer program product comprising: program code for receiving a plurality of incoming message packets; program code for identifying a subset of the plurality of incoming message packets as being an attack on the networked device; program code for determining a plurality of indicator parameters of the identified subset of attacking message packets; program code for dynamically defining an attack defense processing rule as a function of the determined plurality of indicator parameters; and program code for applying the attack defense processing rule to subsequently received incoming message packets to fend off the identified attack.

A system for controlling access to a networked device is provided with the system comprising: means for receiving a plurality of incoming message packets; means for identifying a subset of the plurality of incoming message packets as being an attack on the networked device; means for determining a plurality of indicator parameters of the identified subset of attacking message packets; means for dynamically defining an attack defense processing rule as a function of the determined plurality of indicator parameters; and means for applying the attack defense processing rule to subsequently received incoming message packets to fend off the identified attack.

Identifying the subset of incoming packets as being an attack may comprise: receiving a predetermined number of access requests for the networked device over a predetermined period of time, wherein the access requests have at least one common parameter value.

The common parameter value may be at least one of: a source address value; a destination address value; a source port value; a destination port value; a network protocol value; an outgoing interface value; and a requested service value.

In one embodiment, the attack defense processing rule may comprise a first test corresponding to a first level of a security hierarchy and a second test corresponding to a second level of the security hierarchy, wherein the security hierarchy comprises at least one other security level between the first and second security levels, and the method may further comprise: applying the first test to the new incoming message; and applying the second test to the new incoming message if the first test is passed; and discarding the packet if either of the first and second tests is not passed, whereby a received packet is rejected at the earliest possible operation in the processing of the packet.

In another embodiment, a method of controlling access at a networked device comprises: identifying a type of access to be controlled; and generating an access control rule applicable to the identified access type, wherein the generated access control rule comprises two portions, each portion corresponding to a level of a security hierarchy.

Another embodiment of the present invention is a computer program product controlling access at a networked device, the computer program product comprising: program code for identifying a type of access to be controlled; and program code for generating an access control rule applicable to the identified access type, wherein the generated access control rule comprises two portions, each portion corresponding to a level of a security hierarchy.

Generating the access control rule may comprise: analytically breaking down the access control rule into: a first portion corresponding to a first level of the security hierarchy; and a second portion corresponding to a second level of the security hierarchy, wherein the second level is higher than the first level in the security hierarchy, and wherein the security hierarchy comprises at least one other security level between the first and second security levels.

BRIEF DESCRIPTION OF THE DRAWINGS

The above and further advantages of the invention may be better understood by referring to the following description in conjunction with the accompanying drawings in which.

DETAILED DESCRIPTION

Figure 1:
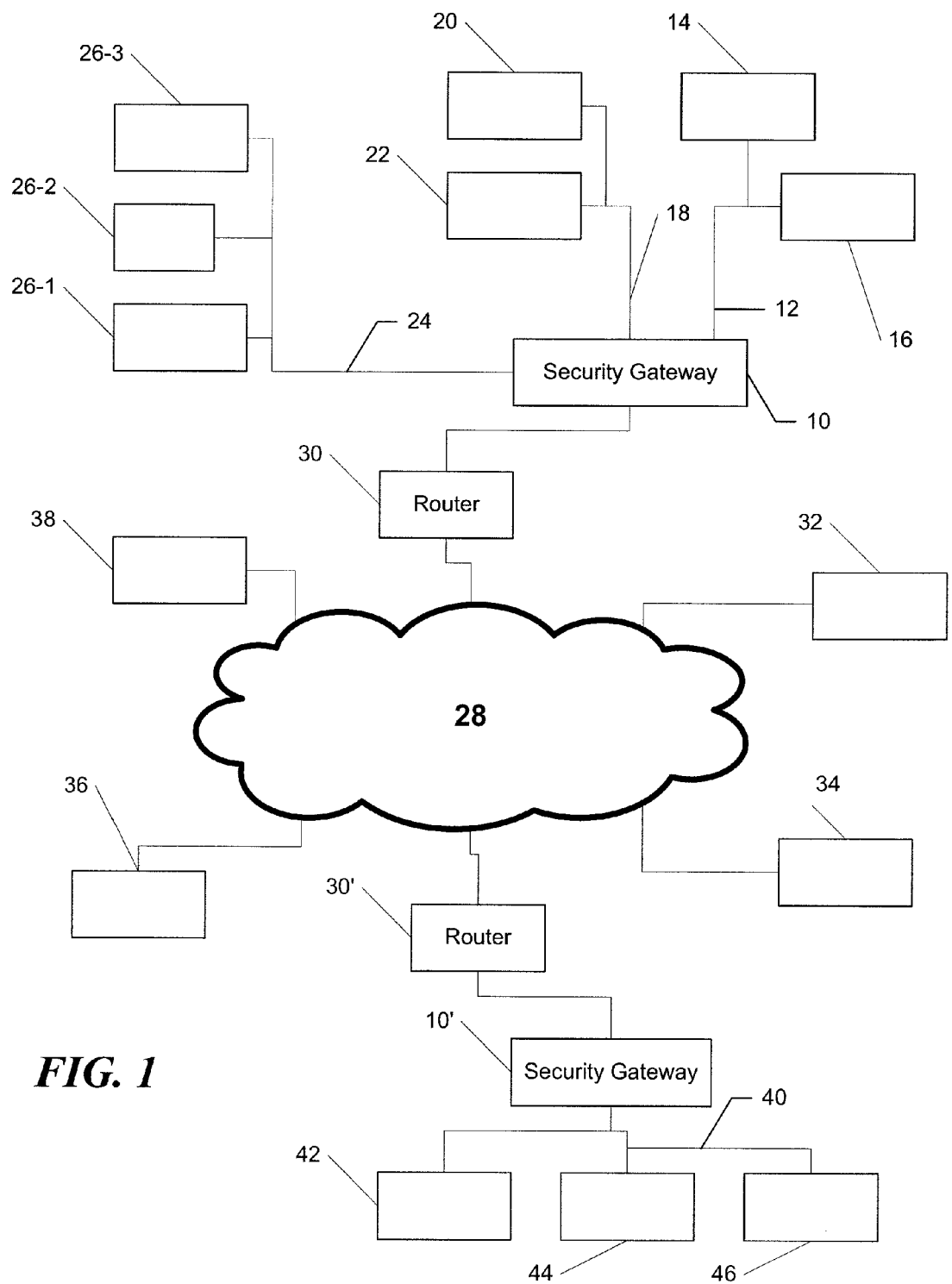
FIG. 1 is an illustration of a network in which one embodiment of the present invention is implemented.

As described above, current UTM devices evolved from adding additional functions onto firewalls to leverage the processing capabilities. As new features were needed, the necessary module was "bolted" on. It is this approach of just "adding on" that has led to inefficient designs of current UTM implementations.

Current UTM implementations or devices use a disparate approach for security rules processing. This disparate approach is the result of legacy firewall implementations that are augmented with new security features. As a result, security checks are invoked at each decision point and the results are not shared among security features leading to a duplication of the checks and inefficient processing of rules. For example, a UTM implementation may check a source and destination address at multiple points in the security evaluation process to ascertain the same type of information. In addition, connection information is recorded at the device and network layers and propagated to a rules engine using software structures, which include the source and destination addresses and ports, along with the network protocol type, e.g., TCP, UDP, etc. These data structures are re-formatted and validated at various decision points, depending on the requirements of the features. For packet inspection devices, rules are evaluated in a packet filter engine, for application level firewalls, this is done in the proxies.

The introduction of a UTM device has these security features present and active at the same time. These security features require a unified security mechanism, that facilitates the unison and integration of the security information and decision points.

As will be discussed below in more detail, in one embodiment of the present invention, a Unified Relational Rules model (URR) provides for the sub-setting of rules and the ability to derive a result based partially from previous security measurements. The URR facilitates the sharing of a security check from one security implementation to another using an object-oriented methodology. Policy is divided into specific security features that result in a security hierarchy as will be discussed below.

The security features may be considered to be listed sequentially, from bottom to top, and form a relationship with one another. These relationships are used to build a security measure upon a previous security measure and may be used as a pre-cursor when marshalling data content to be validated.

Past rules models used a monolithic approach in which a specific aspect of the security check would be validated for each feature. For example, a source and destination address would be evaluated at the packet filter level, access control level and content filtering level. In the URR model, rules are created based on a relational tree. Past implementations used rule sub-sets that did not have the ability to associate the relationship back to the proceeding security feature context, which resulted in duplicate security checks. The sub-setting used in the present URR model provides the ability to formulate the relationship between one security feature and another using this relational tree. Advantageously, the security hierarchy facilitates configurable degrees of security protection.

The invention is herein described, by way of example only, with reference to the accompanying drawings. It is stressed that the particulars shown are by way of example and for purposes of illustrative discussion of the various embodiments of the present invention only, and are presented in the cause of providing, what is believed to be, the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Prior to explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

It is appreciated that certain features of the invention, which are, for the sake of clarity, described in the context of separate embodiments, may also be provided in combination in a single embodiment. Conversely, various features of the invention, which are, for brevity, described in the context of a single embodiment, may also be provided separately or in any suitable subcombination.

In one embodiment of the present invention, the hierarchical URR-based UTM model and system is implemented in a Unified Threat Management (UTM) security gateway 10 as shown in FIG. 1. The security gateway 10 provides protection for various internal network topologies, services, and deployments. In this example, internal is meant to represent the networks within an enterprise, for example, a business or geographic location. The network services include, but are not limited to, HTTP, FTP, Telnet and Web Services. Each of these services must be protected from malicious use from both the internal network and external Internet. The security gateway 10 provides network services to allow clients to communicate with remote computers over both IPv4 and IPv6. The network services include DHCP, routing protocols, DNS and tunneling capabilities.

As shown in FIG. 1, the security gateway 10 is coupled via a network 12 to devices 14 and 16. The network 12 may be an internal IPv4/IPv6 network dedicated to, for example, a Sales/Marketing department, and the devices 14 and 16 can be either client devices or server devices. An internal general network 18 running IPv4/IPv6 for clients 20, 22 may also be connected to the security gateway 10. In addition, an IPv4/IPv6 service network 24 may be connected to the security gateway 10. An anti-virus/patch update server 26-1, a UDDI server 26-2 and a web server 26-3 may be connected via the network 24 to the security gateway 10.

All of the devices on the networks 12, 18 and 24 gain access to an external network 28, for example, the Internet, via the security gateway 10 and an IPv4/IPv6 router 30. Other devices or systems 32-38 include servers, PDAs, and client devices. Of course, the network 28, as well as networks 12, 18 and 24, may be implemented in any of known protocols including wireless.

Further, a second router 30' and second security gateway 10' may be provided to connect to a remote office network 40 affiliated with the enterprise and on which devices 42-46, for example, clients, servers, etc., reside.

One of ordinary skill in the art will understand that the system as shown in FIG. 1 is representative only and not intended to limit the invention in any way. FIG. 1 is provided to aid in the description of the present invention.

As will be discussed below in more detail, the architecture of the URR provides for dropping undesired traffic at the earliest point of the security hierarchy. For example, if there is provided a filter rule denying traffic for a specific source and destination host, a packet having the undesired source/destination combination should be dropped in the packet filter engine, generally one of the first security checks applied to traffic. It is also important to note that the security hierarchy of the present invention is not absolute. Security features may be ordered differently based on implementation.

The security gateway 10 uses end-point security to provide distributed security to compliant and non-compliant devices. Distributed security allows the security gateway and clients to negotiate the level of security checks performed and the time in which they are performed. For example, anti-virus compliant client FTP data streams are not "scanned" by the security gateway, but are off loaded to the capable client. The architecture is designed around the distributed security model to provide an infrastructure that can be extended when new security solutions are discovered and/or required.

It will be noted that the provision of network security is a goal of the present invention as implemented by the security gateway 10. Advantageously, the architecture of the present invention provides a system with as high a level of performance with respect to the provided level of security. The architecture of the present invention detects and rejects bad data streams as soon as possible with respect to receipt of the data stream at the security gateway 10. According to the present invention, security is multi-layered, with each security feature building on the level of security provided by the security feature below it in the hierarchy. As the present invention provides a hierarchical security system, security features may be licensed separately from one another and may be enabled or disabled separately depending on the security requirements of a system as determined by a system administrator. The security architecture of the present invention protects resources that reside in a "guarded" network in addition to protecting the security gateway 10 itself.

Figure 2:
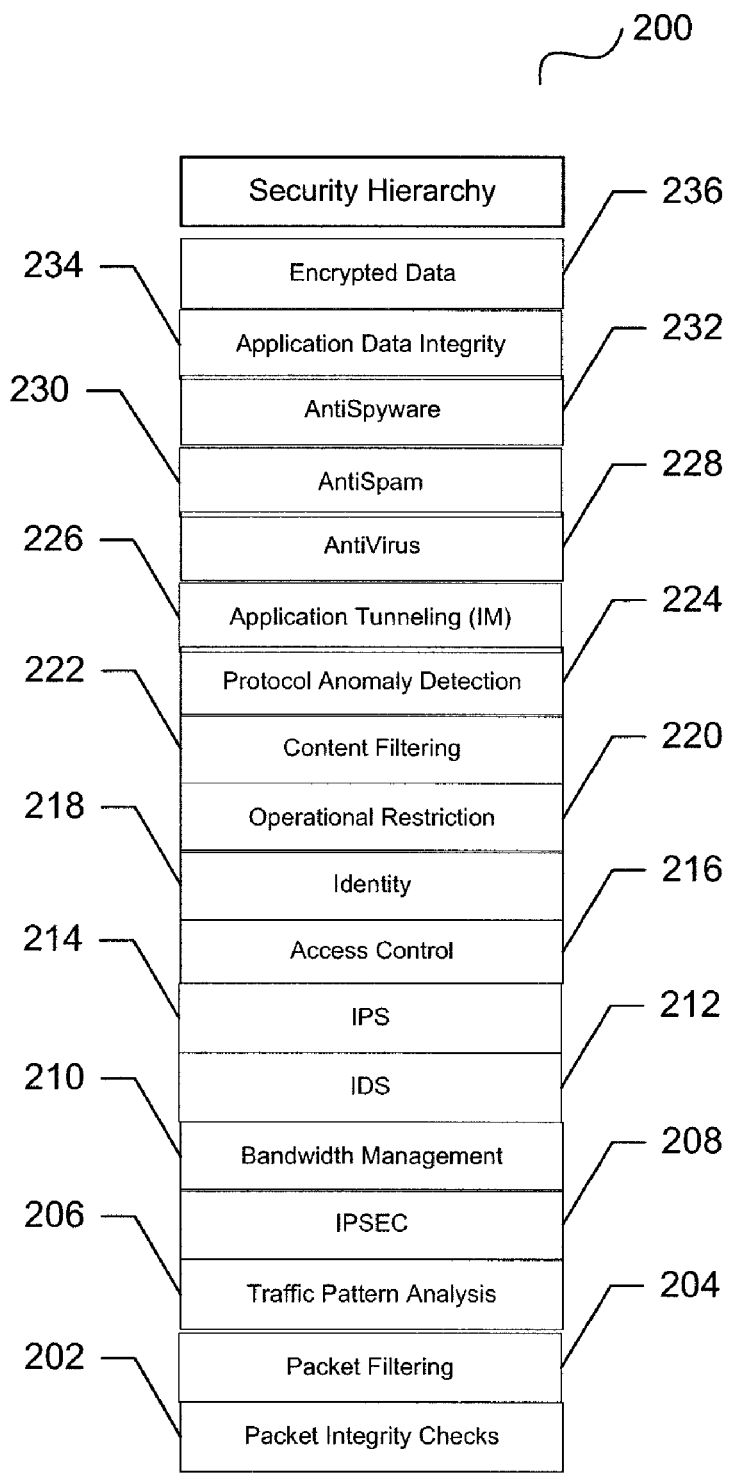
FIG. 2 is a block diagram of a security hierarchy according to an embodiment of the present invention.

In accordance with one embodiment of the present invention, a security hierarchy 200, as shown in FIG. 2, is provided. As shown, the security hierarchy 200 establishes a relationship between security functions from a lowest level to a highest level. As has been mentioned, each security feature builds on the security provided by the security feature or features below it in the hierarchy. A packet integrity check level 202 controls the traffic allowed on an interface (IPv4/IPv6) and insures packet integrity and provides flood prevention and prevents denial-of-service (DOS) attacks. A packet filtering level 204 filters on source and destination address and port information and may also filter on protocol type, for example, TCP/ICMP/UDP. A traffic pattern analysis level 206 restricts traffic based on invalid traffic patterns. An IPSEC level 208 provides encrypted security data encapsulation. A bandwidth management level 210 controls the access to a service based on available bandwidth. An Intrusion Detection Services (IDS) level 212 provides intrusion detection protection. An Intrusion Prevention Services (IPS) level 214 provides intrusion prevention protection. An access control level 216 controls access based on time, connection limits, service requested, etc. An identity security level 218 controls the access to a resource based on identity validation. An operational restriction level 220 controls the type of access to resources, such as GET/PUT. A content filtering level 222 restricts the access to resources based on rating. A protocol anomaly detection level 224 detects and protects protocol violations that might allow possible attacks to get through. An application tunneling (IM) level 226 controls the use of tunnel applications such as Instant Message traffic. An anti-virus security level 228 validates the integrity of a payload, including compressed formats. An anti-spam security level 230 prevents the flow of unwanted data. An anti-spyware level 232 protects against spyware applications. An application data integrity level 234 validates data used by dynamic applications such as web services. An encrypted data security level 236 provides encrypted secure data (SSL/TLS).

In general, there is a finite amount of latency associated with a security feature that will increase as the depth of the inspection is increased. Advantageously, the architecture of the present invention minimizes the latency due to the design of the lower levels of security because of their relationship to the data stream and the primary security that is provided.

Security is provided at all levels of packet processing. In accordance with one embodiment of the present invention, there is a relationship between the packet flow from packet to datagram to stream and the security spine 200 as shown in FIG. 3.

It should be noted that some security features may integrate at multiple levels of the spine, for example, intrusion detection services may integrate at both the datagram and stream level. As shown in FIG. 3, portions of access control 216 are implemented throughout the security spine 200.

Figure 3:
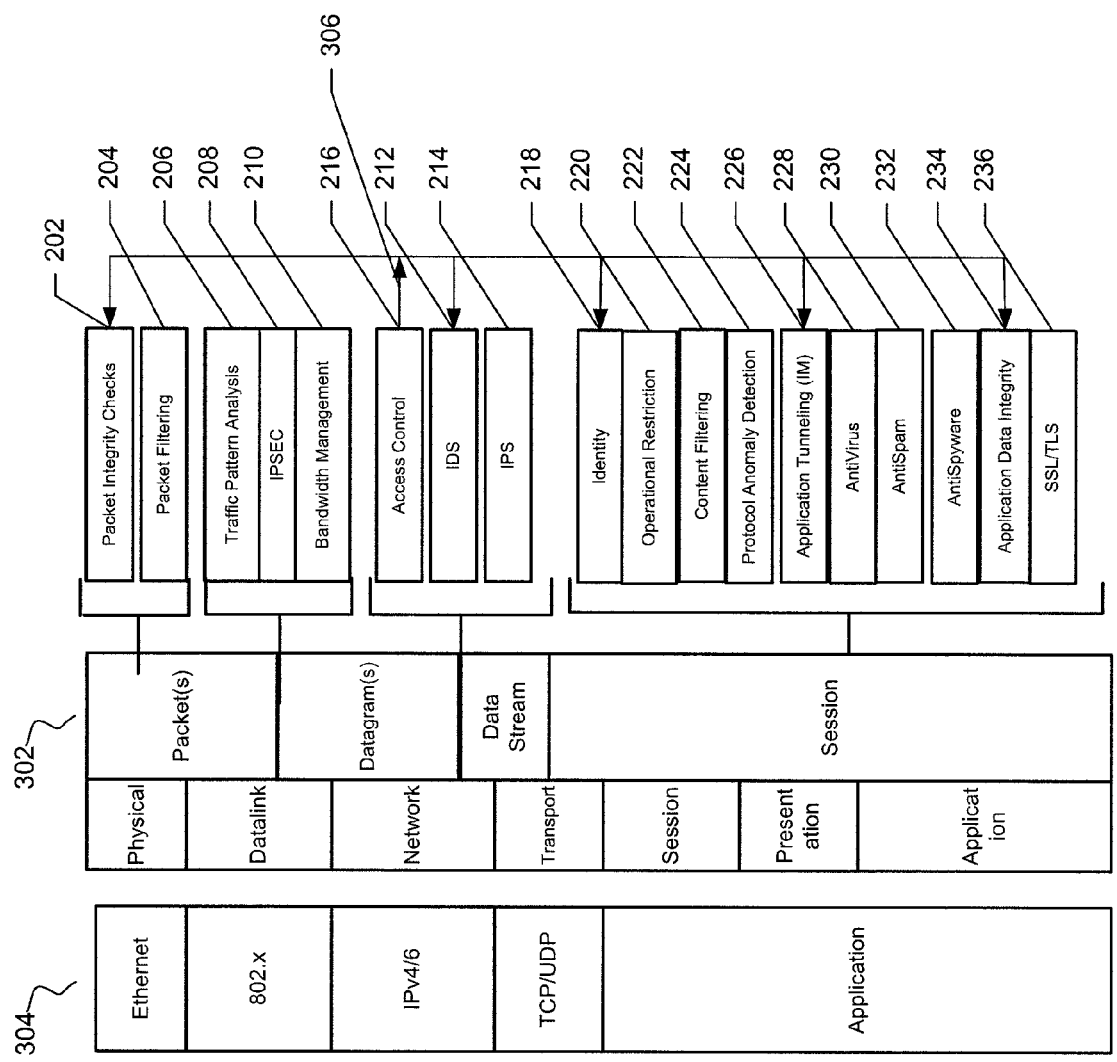
FIG. 3 represents a relationship between the packet flow from packet to datagram to stream and the security spine or hierarchy.

As shown in FIG. 3 in accordance with the present invention, there is a relationship between the security levels and the OSI network model 302 and the TCP/IP stack 304. Thus, as shown in FIG. 3, portions of access control 216 are implemented throughout the security spine 200, i.e., a distribution of access control throughout the security spine is one advantage of the present invention. Source and destination addresses can be processed at the packet filtering level 204, protocol access control can occur prior to IDS scanning, user access control can occur during identity checking and application operational access control can occur during application integrity checking. As stated above, it is beneficial to drop offending traffic streams at the very lowest level in the spine, thus improving performance and security.

As shown in FIG. 3, the "up-arrow" 306 leading from the access control portion 216 to other features of the spine represents the relationship between access control 216 and features at other levels of the hierarchy. This relationship will be discussed below in more detail.

Figure 4:
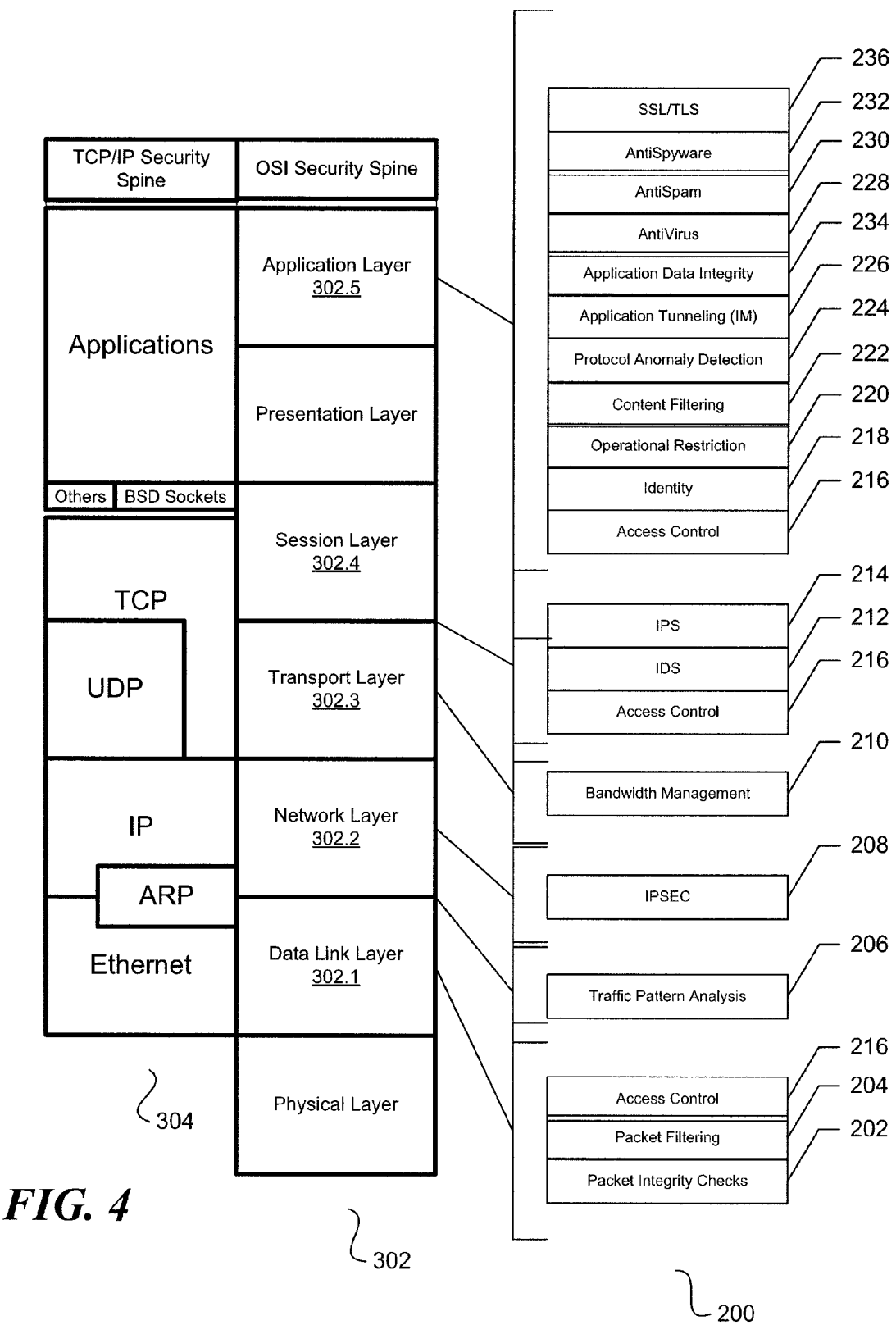
FIG. 4 represents a relationship between the International Standards Organization OSI (Open Systems Interconnection) model and the security spine.

In general, the present invention provides an extensible architecture that is capable of being augmented with existing and future security features as necessary. As above, central to the architecture is the security spine 200. The security spine 200 facilitates a pluggable framework to allow for a dynamic configuration and the ability to attach and/or detach security modules. The spine 200 includes defined interfaces for each of the components to allow for easy integration. As shown in FIG. 4, using the International Standards Organization OSI (Open Systems Interconnection) model, specific security features may be plugged into the data stream at the level that most benefits the architecture and implementation. The spine 200 provides the network with the connectivity required for a network device, while the features attached to the spine provide the security aspects. For example, the spine provides the ability to dynamically configure network clients, while the security module insures that data transmitted through the security device 10 is allowed and free from malicious entities.

As shown in FIG. 4, in one non-limiting implementation, access control 216, packet filtering 204 and packet integrity checking 202 are implemented at the data link layer 302.1. Traffic pattern analysis 206 is implemented at the interface between the data link layer 302.1 and a network layer 302.2. The IPSec function 208 is mapped to the network layer 302.2 and the bandwidth management function 210 is mapped to the transport layer 302.3. Intrusion prevention services (IPS) 214, intrusion detection services (IDS) 212 and access control 216 map to an interface between the transport layer 302.3 and the session layer 302.4.

The access control level 216, identity security level 218, operational restriction level 220, content filtering level 222, protocol anomaly detection level 224, application tunneling (IM) level 226, anti-virus security level 228, anti-spam security level 230, anti-spyware level 232, application data integrity level 234, and encrypted data security level 236 map to the application layer 302.5.

It should be noted that the security hierarchy of the spine 200 is not absolute and that one of ordinary skill in the art will understand that the security features may be implemented before or after others based on the design of the system.

Further, some security features may span multiple layers in the OSI model when implemented and security features may be intertwined and have nested relationships with one another. As stated already, the present invention provides for dropping traffic found to be in violation of a security policy at the earliest possible point in the security spine 200.

Figure 5:
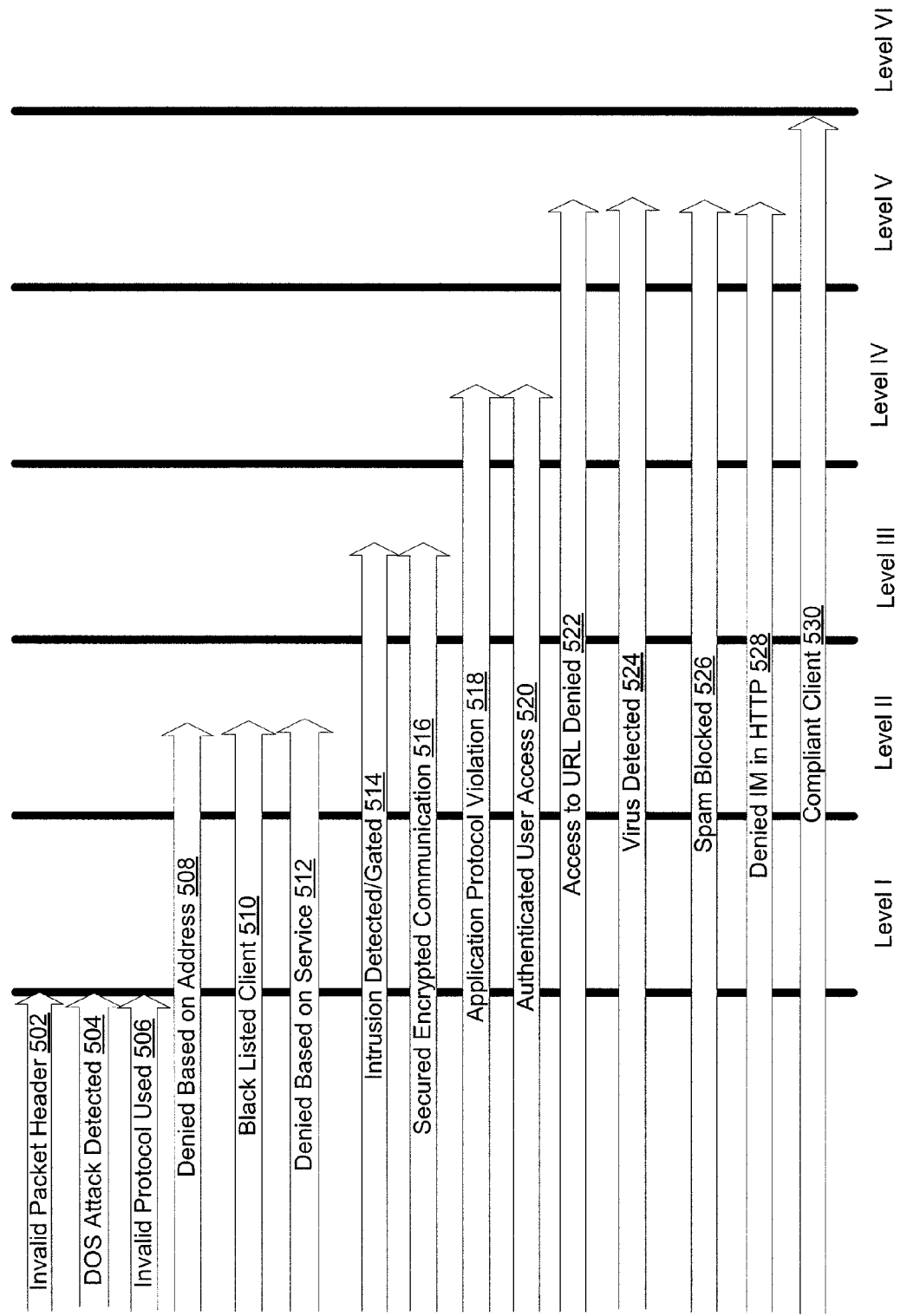
FIG. 5 depicts the functions of the security levels of the security spine.
Figure 6A:
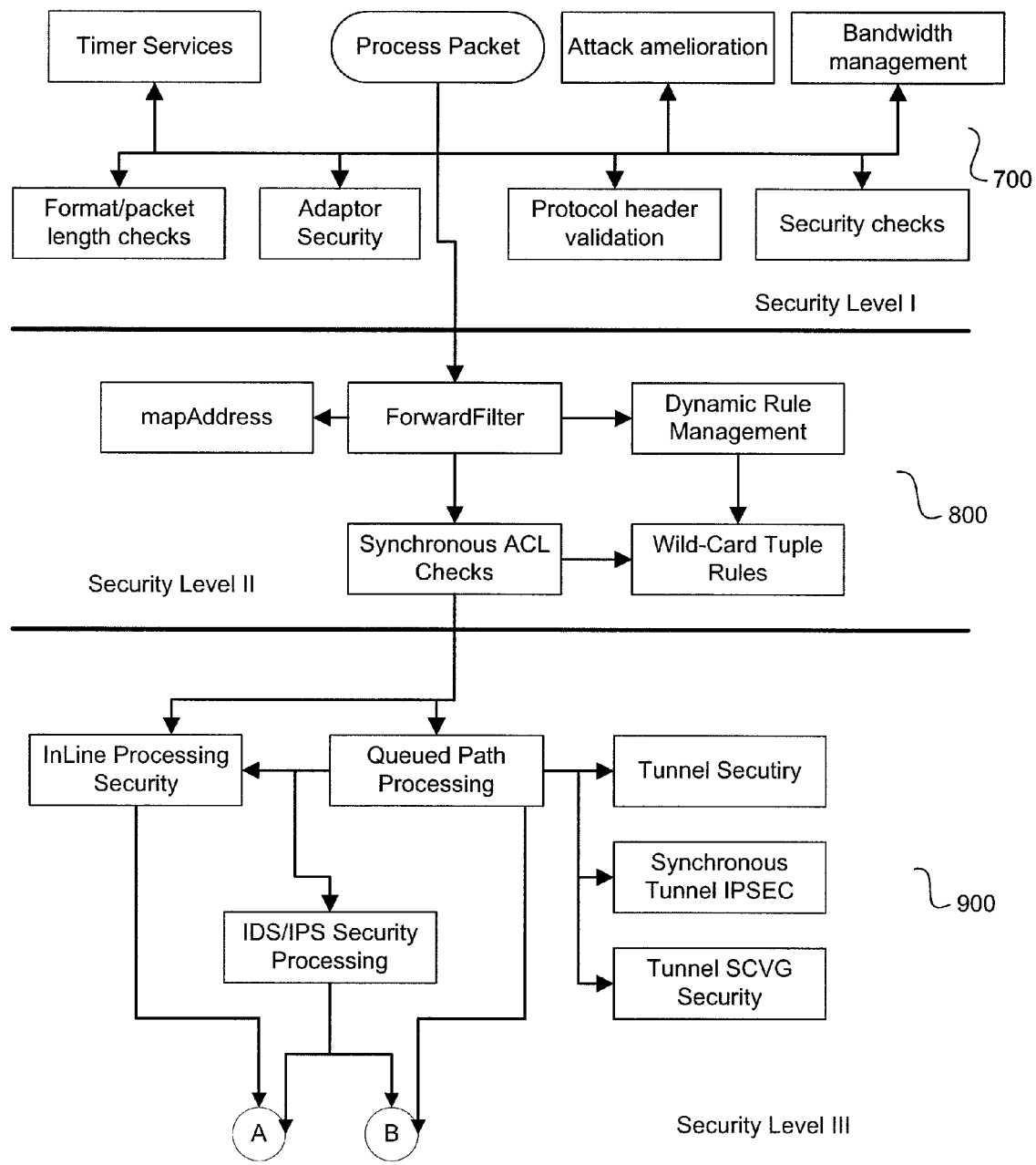
FIGS. 6 and 6A-6C present the hierarchical relationships between the layers of security.
Figure 6B:
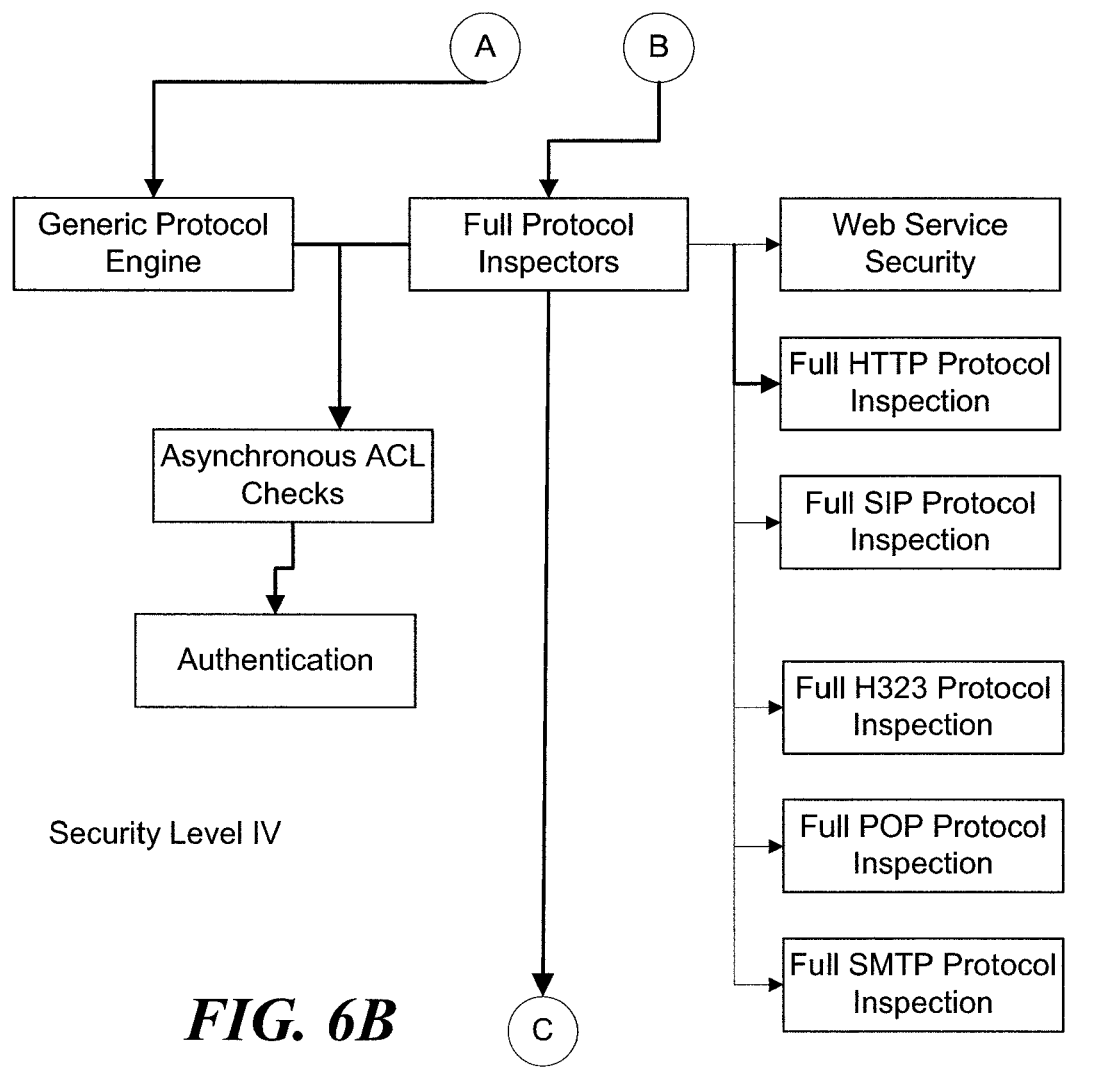
Figure 6:
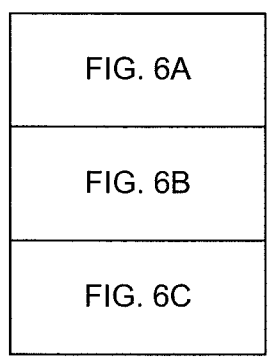
Figure 6C:
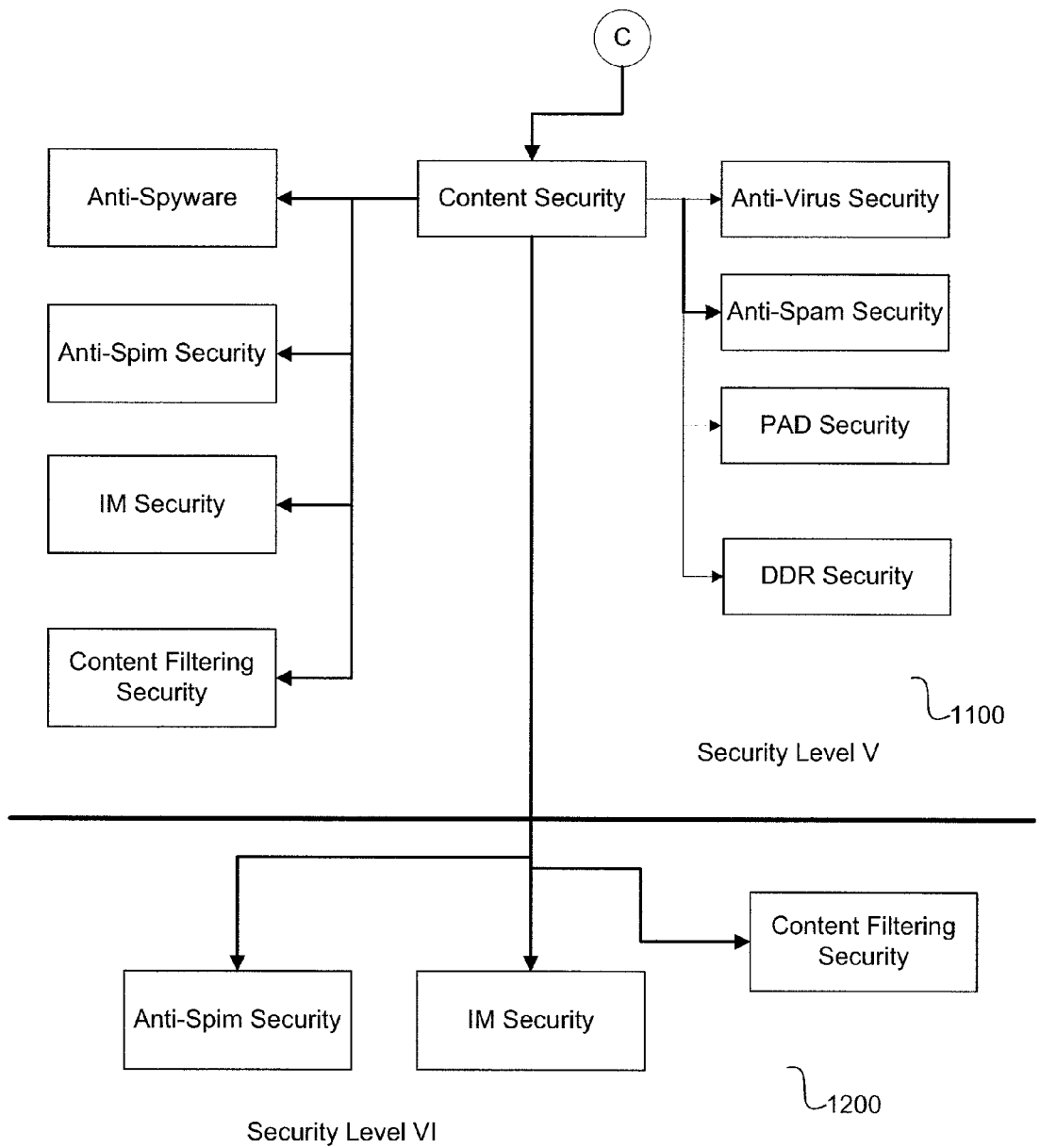

Advantageously, in accordance with one embodiment of the present invention, authorization of a packet or data stream through the security gateway 10 is facilitated by processing both access rule as well as policy defined for specific features or components. An authorization system is comprised of six levels of security where each level of security is contingent on the next lower level. As shown in FIG. 5, Security Levels I-VI build from a lowest level (I) to a highest level (VI). As discussed above, the lower level policies are used to protect a system from threats and attacks, and the medium or mid-levels protect and validate operations to and through the system from a requestor to a resource. Finally, the higher levels of security insure compliance and protect against attacks on specific services and resources.

As conceptually represented in FIG. 5, an invalid packet header, a DOS attack 504 and the use of an invalid protocol 506 would be stopped at security level I. Incoming traffic will be denied based on address 508, due to a blacklisted client 510, or due to an invalid service 512 at security level II. Intrusions 514 will be detected and/or gated at level III in addition to establishing or allowing secured encrypted communication 516. At security level IV, an application protocol violation 518 will be detected and an authenticated user 520 will be granted access.

At security level V, access to a URL 522 may be denied, virus detection 524 is provided, spam is blocked 526, and instant messaging (IM) in http 528 may be denied.

At security level VI, client compliance 530 is determined.

Low level security policies are defined for the driver, however, not just for the driver but all the way up to the TCP/IP levels, to allow it to determine what type of packets are allowed to/through the security gateway. These packets may include IPv4 or IPv6 packets. Packets that are not allowed are logged and dropped immediately. Once packets enter the system, they are processed using pre-defined and/or dynamic rules that account for the source, destination and service being requested. These are generally referred to as "flow control rules." Rules may further be checked as the request passes from the driver to the application. At the application level, rules may be applied that specify access and authentication attributes. Policies may also be applied at the application level. For example, the type of security checks required for a given service, such as anti-virus (AV) policies that apply to the HTTP service. Users and groups may also be tied to a role. A role is a specific usage environment in which a person is categorized. The categories may include administrator, user, or maintenance. Each person belongs to one or more roles and access to the security gateway is controlled based on the role. In addition to roles, the client system in which they are using to communicate to and through the security gateway is also measured for security compliance. Based on this compliance and the level of trust associated with the system and user, adaptive policies are applied to ensure a transaction meets all predefined security requirements.

The authorization system is comprised of several components, each of which are "thread safe" in that the routines can be called from multiple programming threads without unwanted interaction between the threads. The inventive architecture facilitates both a user level and kernel level interface, which provides access routines to the rules infrastructure. Rules are processed within the context of the application that is calling it. A shared memory structure is used to provide a common rule set for all applications. The result of each rules check is recorded and available for subsequent rule checks by other components or applications as required. In general, security content is passed up from the lowest level of security (I) to the highest security level (VI).

Rules define how far up the security level traffic must pass before it is fully validated. Some rules may be satisfied at level III, others at level V, depending on the specific type of traffic being requested.

The rule set is divided into subsets that can be evaluated at specific layers of security. Major categories are the following:

Level I—flow policy;
Level II—address mapping/synchronous authorization;
Level III—in-line security/IDS/tunnels;
Level IV—protocol analysis/asynchronous authorization;
Level V—content scanning; and
Level VI—end point compliance.

The layers of security and the relationships therebetween are set forth in

FIG. 6.

Each level provides specific security features that may include, but are not limited to, the following security features:

Security Policy Checking;
Packet Flow/Fast Path;
Intrusion Detection;
Application Protocols and Services;
Authentication;
URL Filtering;
Content Filtering—Anti-Spam/DDR;
Content Scanning—Anti-Virus;
Web Application Data Scanning;
Alert Thresholds;
Time Restrictions; and/or
Bandwidth Control.

Figure 7:
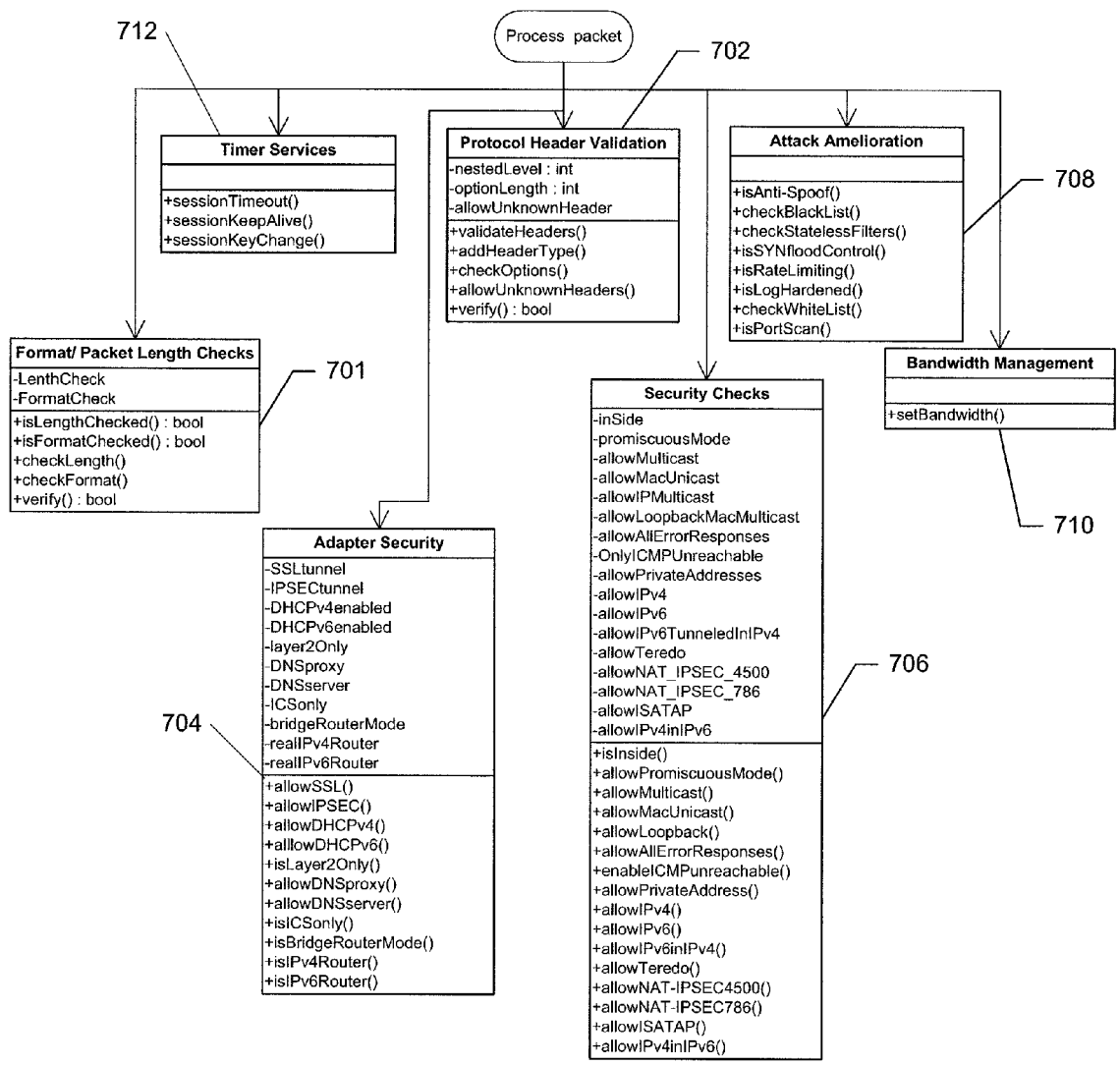
FIG. 7 expands on the security functions of Security Level I.

As shown in FIG. 7, Security Level I 700 provides the means to determine that an incoming packet is valid, does indeed meet the security requirements of the system and is therefore allowed to flow through to the next level of security checks. In general, security processing should drop packets at the earliest time possible. For Security Level I, policies are based on protocol acceptance, bandwidth restriction and system hardening protection. Bandwidth restrictions are influenced by the results from security checks at the higher levels, as well as attack amelioration at this level.

Packets received must pass a minimum set of criteria before they are accepted by the security gateway for additional processing. Packet format validation 701 is performed on the packet to ensure it is the correct length and contains a correct packet format. Packets that do not meet this criteria are dropped immediately. Subsequent processing of the packet assumes that the packet is a valid packet. This feature of the security gateway is part of the system hardening aspects of the gateway. It is intended to circumvent buffer overflows and other harmful events due to invalid packet formats.

Protocol header validation 702 ensures that only specific "well-known" headers are allowed to be processed and traverse the security gateway. For IPv6, headers must reside within the packet in a specific order. Unknown headers, or headers that are identified as a security risk, are not permitted into the gateway. Responses to an unknown header range from an ICMP error to the silent dropping of the packet. In addition to packet types, options may also be configured and managed by this security policy. Option checking protects against invalid options and invalid formats of the options specified.

Adapter security 704 identifies the type of traffic which an interface is allowed to process. Specific traffic, such as DNS or IPSEC, may be denied and dropped at the adapter. This ability allows the disabling of a service before system resources are devoted to processing it. The types of traffic that can be defined at the adapter are:

DHCP;
DNS;
Routing;
IPSEC;
SSL;
Routing IPv4 and IPv6;
Layer 2 only traffic; and/or
ICS traffic.

Security policy checking 706 checks incoming packets for RFC compliance and integrity. It also facilitates the ability to control specific packet types and limit their transfer across networks interfaces. Security policy is separated into three major sections.

The first section includes global security attributes:
The interface is on the inside instead of the default outside network;
Allow Promiscuous Mode;
Permit Multicast
Allow MAC Unicast And IP Multicast;
Loopback MAC Multicast;
Prevent All Error Responses
Generic Error Response Only For ICMP Unreachable; and/or
No Private Address.

The second set of security attributes defines the security policies active for IPv4 and IPv6. Most of these attributes specify the transition mechanisms allowed from network to network. These attributes consist of the following list:

IPv4 Native;
IPv6 Native;
IPv6 Tunneled Within IPv4 (aka 6 to 4 or protocol 41);
Teredo (IPv4 UDP Encapsulation of IPv6, UDP port 3544);
NAT'ed IPSEC 4500 (IPv4 UDP Encapsulation of ESP);
NAT'ed IPSEC 786 (another IPv4 UDP Encapsulation of ESP);
ISATAP; and/or
IPv4 Tunneled Within IPv6.

Adapter security policies control the attributes provided for the flow of management traffic permitted to traverse the gateway. This traffic is generally used to add the configuration of a network infrastructure, such as DNS, DHCP and routers. The types of attributes included are:

If the adapter serves as an encryption endpoint, two types of crypto are IPSEC and SSL;
An adapter can be a DHCPv4 and/or DHCPv6 server;
The adapter is layer 2 only. No IP addresses are required.
The adapter could be a member of a bridge;
Typically either a DNS server and/or a DNS proxy;
The adapter is only a host with no ICS; and/or
As a brouter, the adapter is running in both bridged and routed mode.

Attack amelioration 708 provides the ability to protect itself as well as the networks it is within. When attacks do occur, attack amelioration tries to isolate the attacker and system under attack. Amelioration provides the ability to prevent address spoofing of an internal address, controls blacklists and enforces access restrictions placed upon systems in this list, manages whitelists, prevents vulnerabilities to well known attacks (such as Syn flood) and may apply a number of rate limiting features to avoid resource Denial of Service attacks.

Bandwidth management 710 is used also for attack amelioration. Systems identified as hosting attacks can be rate limited. These systems are allowed to pass a specified amount of traffic to allow upper level security to scan and determine the level of threat. Bandwidth management is used instead, or in conjunction with, blacklisting to automatically determine when a system has run through remediation and no longer poses a threat. The option of bandwidth management is used to circumvent the problems caused by blacklisting of "good" clients that are under attack. In general, blacklist is used as a last resort, the application of bandwidth management and dynamic rules provide better means to provide security and the ability for the offending system to be remediated. The implementation of blacklisting has caused clients to be moved to blacklist, where they remain forever, or until a timeout has occurred (such as a day). These clients are not allowed to pass traffic, good or bad.

Clients that go through remediation and correct vulnerabilities desire to become good, active network citizens right after remediation. Using only blacklisting, this is not possible. Bandwidth management is used to control and measure these systems under attack to ascertain if they have corrected themselves. When a system is under attack, and this event has been identified by the security gateway, the bandwidth that the system under attack may use is tightened. Data from these systems are still allowed and measured, but the amount of data is limited. As more security measurements are taken and no threat is detected, the bandwidth is gradually increased, until it is back to the original setting.

Timer services 712 are used to manage the duration of a session and act as a watch dog for services when measuring the activity of, and processing for, these specific security events when the status of the event may change in time. For example, the blacklisting of a host or client uses a timer event to remove the blacklisted client after a specific amount of time. Timer services are a low level service that may be used by all high level services.

Figure 8:
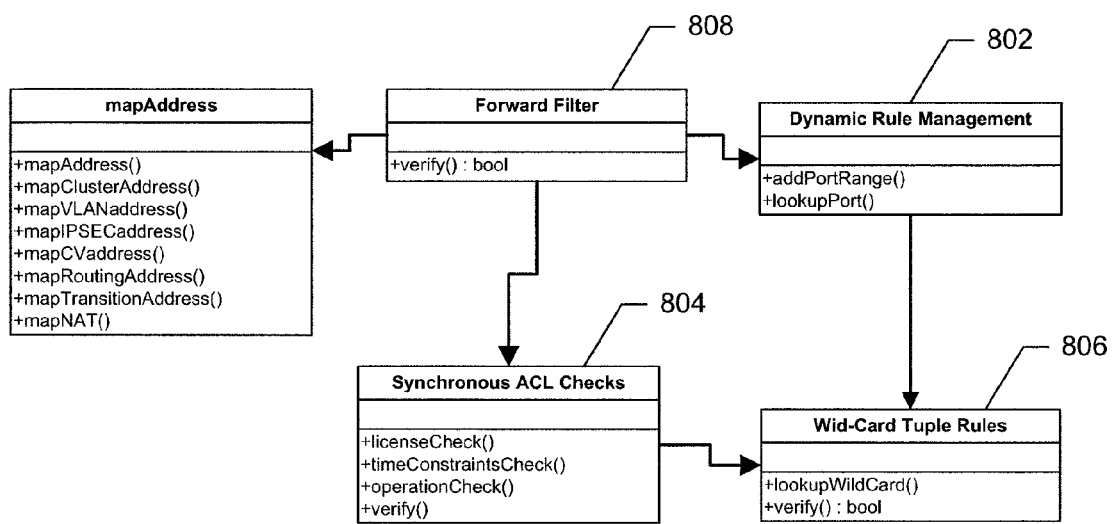
FIG. 8 expands on the security functions of Security Level II.

As shown in FIG. 8, Level II security 800, synchronous authorization, provides the ability to filter packets based on source/destination addresses and protocols. This ability takes into account any address/protocol mapping such as NAT transparency or dynamic protocols. An address may be mapped to and from the source and destination address. This occurs for a number of different reasons in the security gateway 10 to include virtual IP addresses, VLAN usage, IPv6 transition mechanism, and NAT. The ability to map addresses is not restricted to Level II security and may be applied throughout the system. Protocols that use a control/data channel or signal/media channel may require dynamic ports to be opened and allowed to communicate between the server and client. These ports may use the same reserve port or may negotiate which ports should be used. In addition to dynamic ports, negotiations sometimes span protocols, for example, a TCP session may be used as a signaling channel, whereas a UDP channel may be used for transmitting media. This is handled in the dynamic port management component with the application of dynamic rules. These rules are generated by security components as required. For example, a SIP proxy would generate a UDP rule to allow a specific traffic flow to occur.

Access control is generally based on the 5 tuple match of source/destination address and port/protocol identity. A tuple match is the matching of security attributes in a rule. For example, the most common tuple match is 4 tuple, which generally match the (1) source address and (2) destination address and the (3) source port and (4) the destination port. The present invention uses an N-tuple match, which allows for matching on any number or a selective number of security criteria. By N-tuple, what is meant is that the present invention can match on a basic 7-tuple at the lowest level where a 7 tuple match is (1) source address/(2) destination address and (3) source port and (4) destination port, (5) network protocol used (e.g., UDP/TCP) and (6) incoming/(7) outgoing interface (e.g., eth0 to eth1, etc.) In accordance with one embodiment, wildcards are used when a specific match value is not required. As one non-limiting example, the wildcard symbol "*" can be used for the outgoing interface because there may be more than one egress interface that may be used within the system. In one embodiment, the 7 tuple is used for session binding, which forces specific traffic like HTTP to go out a specific interface to a remote server. This usage allows the HTTP server to see the same source address and map it to a specific session that it may be using in, for example, a shopping cart application. This may be too restrictive for some protocols which may use dynamic ports. The ability to provide a wild card tuple that only specifies two or more elements could shorten the rule database and provide a more flexible destination. Wild card tuples may also be extended for large view filters and other meaningful applications as well.

Dynamic Rule Management 802 provides the ability to add dynamic rules which are required for protocols such as FTP and SIP. These protocols generally use a control channel/data channel or signal/media channel in the protocol. The ports are dynamically assigned and negotiated by the client and server of the application.

Synchronous access control 804 primarily facilitates interface and source/destination addresses and port filters. Synchronous access control is also used to determine the flow a received packet must take within the security gateway. The first order of access control tuple rules processing 806 is generally based on the 5 tuple of an incoming connection request but may be restricted up thru 10 tuple to include ingress interface, egress interface, time, authentication and compliance. Authentication and compliance may be measured at this level by Synchronous access control when the security gateway performs these operations Out-Of-Band. For example, a portal login page is used by a user to login to the security gateway. When that system that has logged in requests access through the security gateway to a remote resource, access control can apply user/group level rules at this level. The same is true for Out-Of-Band client compliance. This initial request is measured to determine the security data path required to allow subsequent data flow. Access control validates the request by matching the rule sets that apply to the request. An algorithm is used and a matching deny rule results in the request being denied, whereas a resulting allow rule may result in further processing, based on the relationship with other top level security rules sets.

Filter rules 808 are the root for all subsequent rule relationships, such as protocol specific operational checks, time restrictions or end-point compliant requirements. Rules identify the source of the request, destination of the request and the service to be used. A common example of a rule set allows HTTP traffic from a specific network to a specific server. It is upon this basic rule set that additional security requirements are appended, for example, the requirement of AV scanning and the operational restriction to allow only the protocol "GET" method.

The packet flow attributes of a rule specify the direction in which data may traverse a security gateway. Packet flow rules are applied at the lowest levels of the security hierarchy and can be either stateless or state-full. The definition of the rule requires both a source and destination components. Source and destination rules are represented using the syntax listed in the table below:

| Syntax | Example | Description |
| --- | --- | --- |
| n.n.n.n (n:n:n:n::n) | 128.2.1.3 | IP address (IPv4 and IPv6) |
| n.n.n.n@iface | 128.2.1.3@192.168.101.27 | IP address using interface |
| n.n.n.n=macaddr | 128.2.1.3=00=0D-60-3B-C0-46 | IP address using mac address |
| n.n.n.n&n | 128.2.1.0&8 | Subnet mask with prefix |
| n.n.n.n.&n@iface | 128.2.1.3&8@128.2.1.27 | Subnet mask w/prefix using interface |
| hostname | usarmy.sef102.com | Hostname |
| hostname@inface | usarmy.sef102.com@128.2.1.27 | Hostname using interface |
| domain | .sef102.com | Domain |

In addition to specific filters used to identify addresses and an interface a packet may traverse, a mechanism may be used to stream-line packet flow from one interface to another. The specific fields for driver rules may consider the following:
Source Endpoint: adapter or tunnel;
Source Address/Network;
Protocol (Ports);
Destination Address/Network;
Destination Endpoint: adapter or tunnel; and/or
Action.

A network service may be defined using the port to identify the resource, such as HTTP, FTP and Telnet.

Once an initial connection is established, a flow record is created that identifies the path a packet must take in order to traverse the security gateway. Rules are only applied during the initial connection, once a connection is established, the flow record is used to direct the traffic.

Security level III 900 is used to secure and manage the data flow within the security gateway 10 and data may flow in one of three paths: 1) an in-line path; 2) a queued path; and 3) a tunnel path. The in-line data path is used to manage port redirection and change sequence numbers to circumvent known vulnerabilities. The in-line path is used as a high speed data path for IDS/IPS processing. Synchronous rules are defined that indicate which features of the in-line path must be enforced. Tunnel rules work in conjunction with tunnel security policies to specify the requirement and flow of traffic. The queued path is used to provide in-band security features, such as authentication and client compliance and require that a specific protocol, such as HTTP be used to interact with the end user to specify a specific domain that is required to login to and prompt the end user for input, and is normally associated with asynchronous activity. The synchronous tunnel is used as the encryption/decryption implementation of an IPsec connection.

Figure 9:
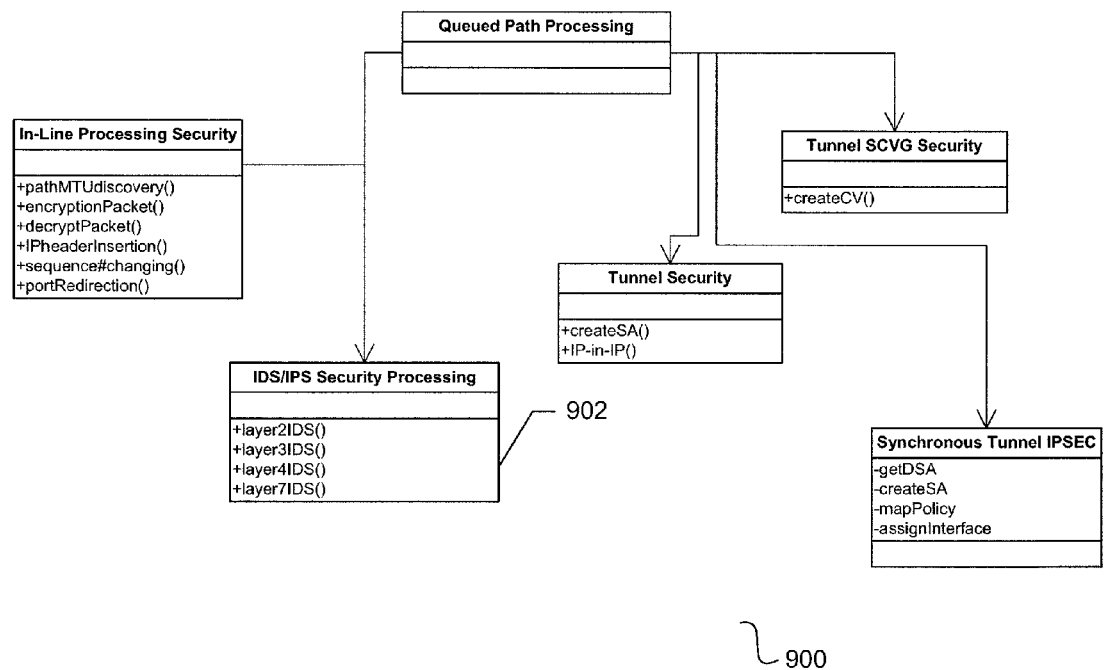
FIG. 9 expands on the security functions of Security Level III.

Tunnel security is used to provide the exchanges and define a security association when required. For SSL tunneling, SCVG security is used. Tunnel rules must be specified to allow traffic to flow to a tunnel end point. For route based tunneling, a tunnel route has precedence over a non-tunnel route. The relationship among the components of Security level III is shown in FIG. 9.

Intrusion detection/Intrusion prevention 902 is a security service that monitors and analyzes events for the purpose of finding and providing real-time, or near real-time, warnings of attempts to access system resources in an unauthorized manner. Intrusion prevention uses intrusion detection mechanisms to prevent intrusions by analyzing and rejecting packets that match known attack types. Each use port mapping and event gating for configured event types. Intrusion detection uses port mapping to match network resource ports to state machines for protocol analysis. For example, a web proxy would use the http IDS state matching analysis engine to detect anomalies. Gating is used to drop traffic that matches an IDS event definition.

According to one aspect of the present invention, dynamic rules for IDS are applied where, instead of IDS receiving multiple traffic streams with the same signature and then dropping them, the IDS engine applies a dynamic rule for the specified source and protocol being used for synchronous access control. In this case, IDS would only see one signature event, all other traffic from the same source, using the same protocol would be dropped. The dynamic rule may be triggered based on thresholds, e.g., the number of occurrences of the event from the source/subnet/network/interface defined for each event, class of events etc. This feature allows for dynamic rules to be generated to prevent well know DOS attacks based on a specific protocol.

IDS events are divided into the following categories:

Suspicious Activity—Including violations of network protocols;

Probes—Including Finger, SMTP, DNS and port sweep probes;

Signatures;

Intrusion Attempts—Including exploit and overflow attacks;

Denial of Service—Including malformed data and flood attacks; and/or

Network Policy Events.

These security checks may be invoked from both the In-Line and Queued Path data streams.

Figure 10:
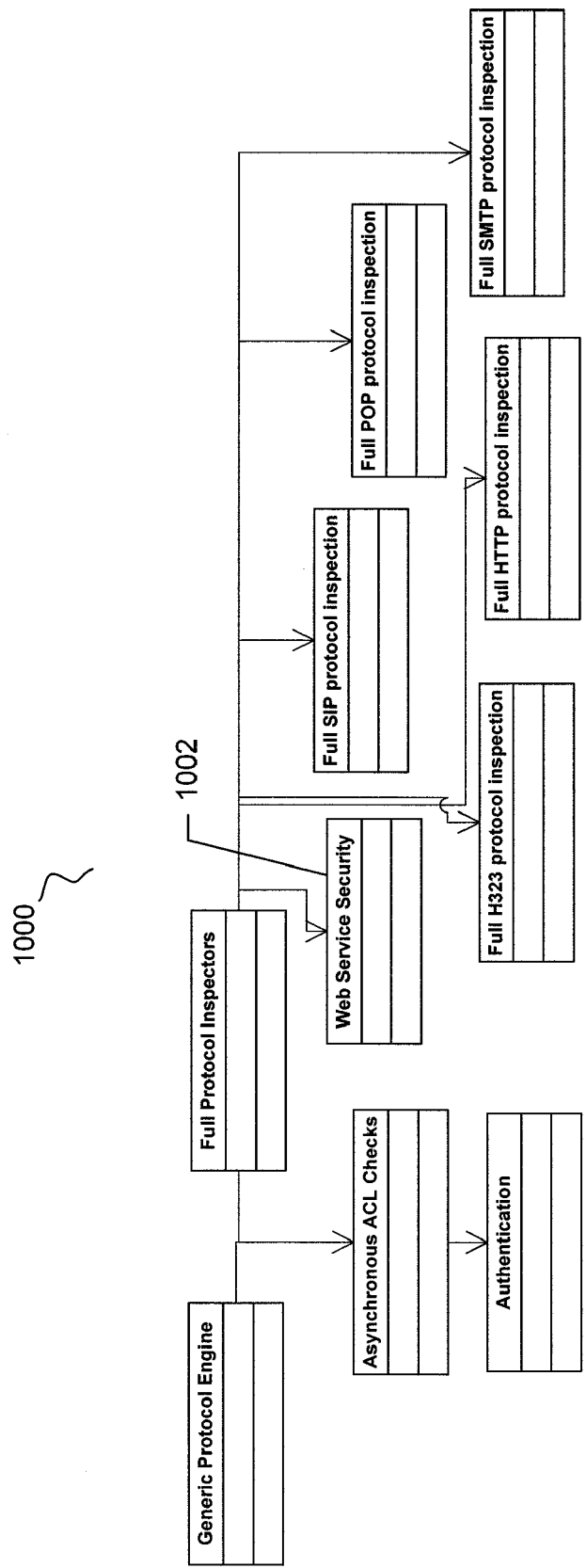
FIG. 10 expands on the security functions of Security Level IV.

Security level IV 1000, protocol analysis/asynchronous authorization, is used to provide protocol analysis and asynchronous authorization. Protocol analysis facilitates the ability to retrieve information based on a specific protocol specification to be used when processing additional rules defined specifically for that protocol. As one non-limiting example, authentication information may be embedded within a protocol to allow the authorization mechanism to use a user name as part of the rules validation. Other request information, such as operation and resource, may also be used to determine the protocol. Further, protocol analysis is done to insure the protocol specification is followed and requests/responses are not ill-formatted. The components of Security level IV are set forth in FIG. 10.

The protocols and services that apply to the rule will be implemented at Security Level IV. These checks are used to determine the operations that are allowed for a specific protocol by a specific user. The normal definition of this feature would include the protocol and operation, such as the following examples:

| Ex 1. | ftp.putonly; |
| Ex 2. | http; |
| Ex 3. | http.allurls; |
| Ex 4. | http.allexts,noauth; and |
| Ex 5. | ftp,noauth. |

A protocol and action is used to define the operation allowed. In the case of above example 1, FTP puts are allowed. In example 3, HTTP to all URLs is allowed. The last examples indicate the level of control required for authentication.

It should be noted that content filtering (using a scan engine) is a heavyweight process, and pre-processing the URL database or pre-selection of specific URLs by an administrator will allow rules to be defined for the application proxy. These rules will be triggered before URL content filtering is performed, saving the database lookup. In addition, the application of the "allurls" rule may either be allowed or denied, in each case, the URL database would not be scanned.

Web service security policy checking 1002 involves the ability to check incoming HTTP requests for RFC compliance and integrity. It also facilitates the ability to control web service applications and restrict access based on policy. Web Service security policy 1002 is separated into three major sections.

The first are global security attributes:

Allow/Disallow web services in HTTP;

Restrict web service to HTTPS traffic only;

Allow/Disallow web services based on Source/Destination address;

Allow/Disallow web service traffic based on time; and

Allow/Disallow web services based on the application name.

The second set of security attributes defines the activity for a specific web service. Most of these attributes specify the operations allowed for a web service implementation. These attributes consist of the following list:

Alarm, alerting and log web service traffic use;

Deny known web service vulnerabilities (IDS/IPS);

Scan attachments for viruses;

Allow web service activity based on an operational list (get, put, etc.); and

Restrict XDOS attacks.

Attributes are provided to validate and control the payload of web service traffic permitted to traverse the gateway and includes:

SOAP schema validation;

DTD validation;

Deny known web service vulnerabilities (XML validation not handled by IDS/IPS);

Element/Attribute buffer overflow

Entity expansion

Element/Attribute assertion

SQL insertion

Use Federated Identity services for authentication and authorization using SAML;

Use WS-Security for encryption/decryption;

Use WS-Security for digital signatures;

Role based access control; and

Task based access control.

In conjunction with web services, the specific UDDI service is further restricted to the following:

Protection of UDDI service;

Allow/Disallow UDDI request using HTTP;

Restrict UDDI service to HTTPS traffic only;

Allow/Disallow UDDI services based on Source/Destination address;

Allow/Disallow UDDI service request based on time;

Allow/disallow UDDI services based on the application name being lookup;

Publish partial UDDI result based on the above characteristics; and

Filter UDDI results from internal/external networks and return partial (stripped) result.

All of the security checks defined above would be part of a specific rule or policy directed at a specific web service.

The alert thresholds restrict the number of connections matching the specified rule that can be received within a specific time interval. The time interval may be specified in seconds and minutes, such as every five seconds or fifteen minutes. It may also be specified in hours, days or weeks before an alert is triggered. This is an optional security attribute, which may not be required for a rule. This security attribute may be implemented in the synchronous authorization component.

The time attribute specifies the window in which the rule is applied, if no timeframe is specified, the rule applies anytime. This security attribute may be implemented in the synchronous authorization component.

Bandwidth control provides quality of service measurements to a flow path. A rule may be dynamically defined and applied to flow paths to allow a specific percent of the data path to be used for a specific protocol This feature provides a Quality of Service (QOS) method to the packet flow process. This security attribute may be implemented in the synchronous authorization component, but the creation of the dynamic rule may be generated from any level and feature of the security spine. For example, IDS may reach a signature threshold and create a bandwidth rule, the HTTP proxy may receive a number of denied operations and trigger the rule, or client compliances may trigger the bandwidth management rule based on the lack of a specific compliance level.

Authentication allows access to be tied to a specific user or group. The means to provide this support must identify an authentication method, as well as the individual or group. The authentication mechanism may specify that a user authenticated using the means specified is allowed to perform the operation listed in the rule. Authentication is commonly combined with application operations. A common syntax for the definition of authentication is the following, "auth=[LDAP], user=[Scotte]." This example identifies that the authentication method of LDAP may be used for the user Scotte. The authentication mechanism used by proxies is exposed using a common interface.

Roles may be defined as an extension to a rule. A role is a logical grouping of access rights and operations defined for a specific type of user. For example, an administrator or a maintenance person role may be created that identifies specific access rights to read and write configuration. Administrators are allowed read/write privileges, while maintenance is only allowed read access. Users and groups may be assigned to roles and specified in a rule, following the example above, "auth=[LDAP],user=[Scotte]",role=[engineering]. In this example, Scotte is allowed access to any system resource that has a role of engineering associated with it. Access control rules may be created that identify specific roles which may be required to access a resource.

Figure 11:
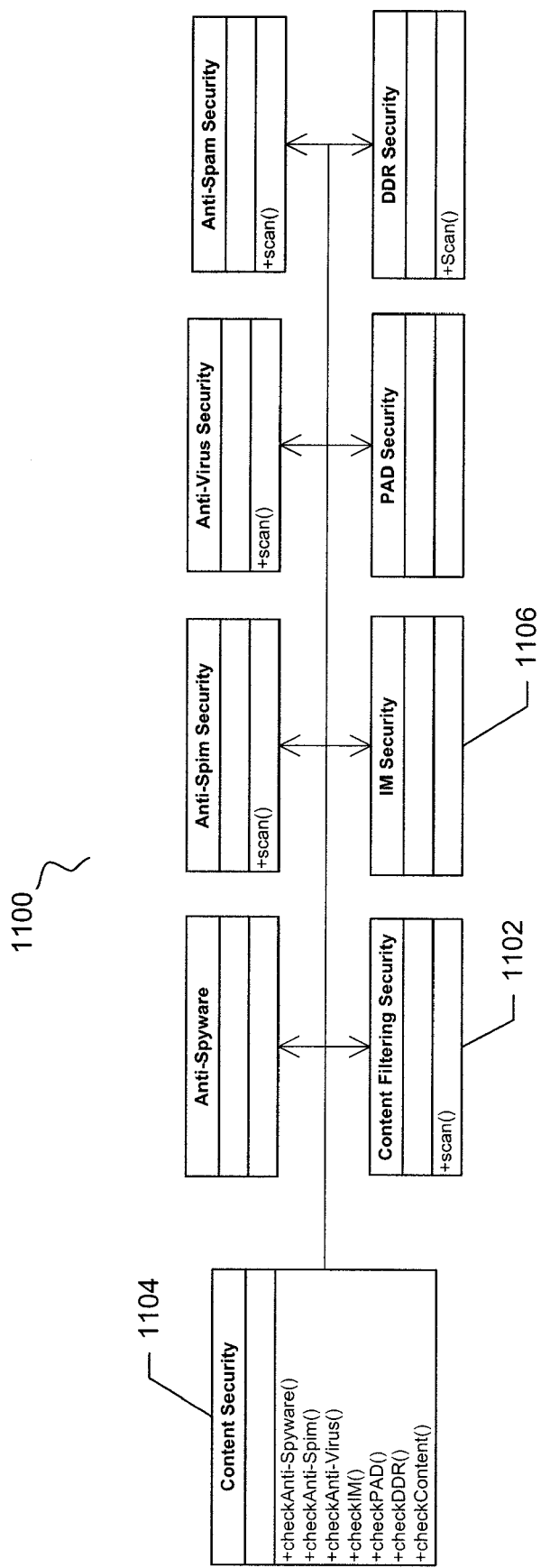
FIG. 11 expands on the security functions of Security Level V.

Content scanning, Level V security 1100, includes URL enforcement and inspection of payloads for viruses, questionable content, spam and spyware. As shown in FIG. 11, a plurality of scanning functions are provided.

Content filtering security 1102 includes URL filtering that uses a rating profile and URL list to define the value of a resource. MIME types, file extensions and newsgroups may also be used. An example of the rating is listed below.

Rating is based on types, such as:
Alcohol-Tobacco;
Drugs/Non-medical;
E/Sports;
Gambling;
Gross Depictions;
Militant/Extremist/Weapons;
Occult/New Age;
Racism/Ethnic Impropriety;
Sex/Acts;
Sex/Attire;
SexEd;
Sex/Nudity; or
Violence/Profanity.

The ability to filter mail is based on the following:
Maximum message size;
Malformed messages;
Message origin;
Subject line;
Attachment names; and/or
Attachment size.

Content security 1104 scans files for malicious content and allows the user to take action based on the desired criteria. The response to the end user may range from a specific protocol aware response, such as an HTTP/HTML page identifying the resource and virus found, to the disconnection of the connection. In addition, a "tickle mode" may be enabled to prevent client timeouts when large files are being scanned.

Web applications use SOAP as a method to publish an application on the Internet/Intranet. At the highest level, the use of SOAP within a protocol may be restricted. Web Service support may be extended to include scanning of the data content. The goal for Web Service proxy support is to protect the end user from the following known security risks:

XDoS attacks—Denial of service attacks based on XML parser vulnerabilities;
Content-Borne Viruses and Worms—Payload attacks in XML content;
Man-in-the-Middle attacks—hijacking the session IDs used in Web Service applications and using playback and forged requests;
Well known XML vulnerabilities:
Entity Expansion;
Element/Attribute buffer overflow;
Element/Attribute assertion; or
Invalid formatted DTDs which may cause a crash in the application
SQL insertion;
Clear Text transmission of XML data; or
Identity threats.

Instant Messages may be tunneled over well-known protocols. to restrict this type of operation, an IM security policy 1106 may be set to disallow Instant Messaging. This policy may contain attribute to allow specific IM traffic and disallow others.

SOAP traffic is embedded in the implementation of the HTTP proxy and will become an integral part of its functionality. In addition, Point-to-Point (P2P) traffic will also be implemented there to include IM, Skype and Kazaa scanning and filtering. Each will be based off of well known signatures that will cause additional scanning for the specific application types.

Security level VI 1200, end point compliance, provides the function of determining if a specific request requires end point compliance and whether the client meets those criteria. The rule system may respond to a verification request with a result that requires both quarantine and remediation by the client.

Figure 12:
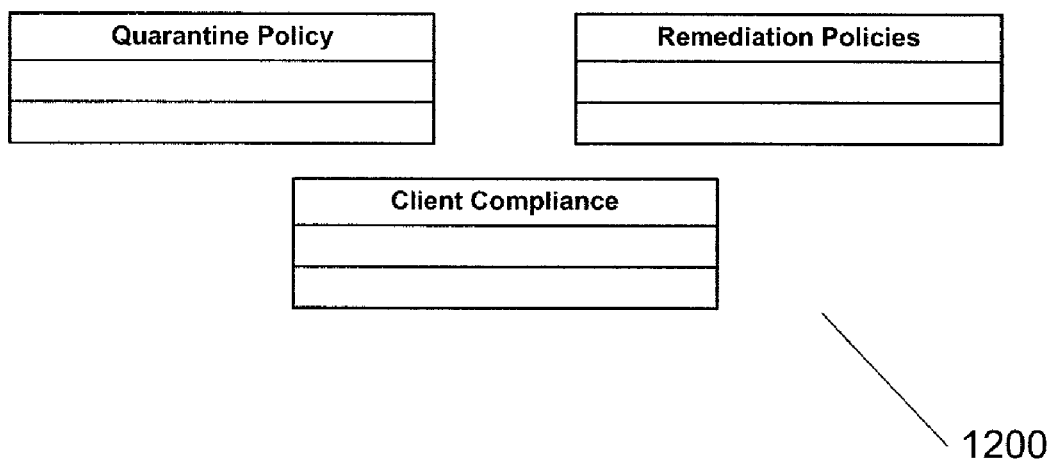
FIG. 12 expands on the security functions of Security Level VI.

As shown in FIG. 12, Security level VI comprises a quarantine policy, a remediation policy and client compliance policies.

The result of the authorization calls from an application proxy, lightweight proxy or driver component will be an indication of the level of compliance for each specific feature, as well as a generalized result. The caller will be able to ascertain the result of the call and provide feedback, if necessary to the user. Part of the response from the authorization check may be the initiation of the client onto a quarantined network. This operation and remediation occur out of band from normal request processing.

When a client is non-compliant, the response from the verify request will specifically identify the areas of non-compliance. One aspect of the authorization system is to tag a flow of control as requiring AV scanning by the security gateway, instead of relying on the client. In this way, clients that may be out of conformance may request operations in which the security gateway will provide the desired level of security. This circumvents a hard failure of a client request when the security gateway is just as capable of providing the level of security desired. For the clients using this method, they may either provide the security required as measured by client compliance, or allow the security gateway to adaptively apply the desired level of security.

In general, a call to the verify interface will result in a list of attributes that must be supported by the proxy for a specific data flow from a client to a server. When client compliance is used and a client meets the level of compliance, security scanning such as AV is off loaded to the client. This provides performance benefits for both the client and security gateway. When a client is non-compliant, the security gateway will respond to a proxy with the requirement of AV scanning. The result is a slight loss in throughput for the client, but the ability to obtain resources during remediation or when remediation is not possible due to other requirements on the client, such as high availability or the inability to obtain a resource required for remediation that requests access to an unprotected environment where client compliance is normally required.

Figure 13:
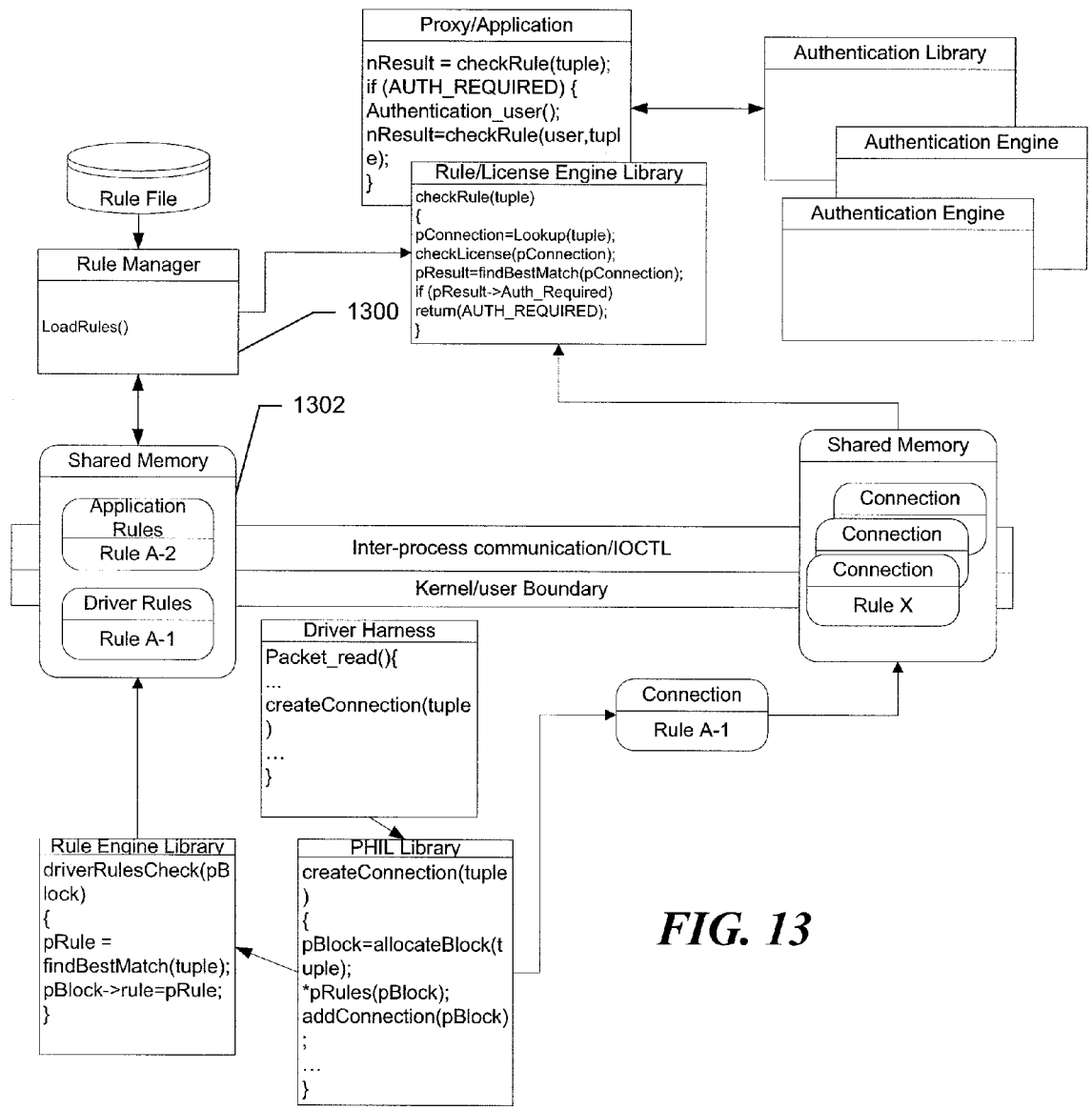
FIG. 13 is block diagram depicting control of rule management functionality in accordance with an embodiment of the present invention.

The overall control of rule management functionality is implemented in a rule manager 1300 as shown in FIG. 13. The rule manager 1300 controls an interface between the low level devices and the application level processes for rule checking. The rule manager 1300 monitors the creation and updating of rules and propagates the changes through a shared memory 1302 for both user and driver mode components. The rule manager 1300 also handles the separation of rule scope between the user and lower level subsets. As shown in FIG. 13, two rule data stores are defined, where the kernel mode data set is a subset of the user mode rule set.

The rule listed in the example is Rule A which is comprised of two data sets, Rule A-1 and Rule A-2. As an example, Rule A-1 is used to identify the lower level rules and Rule A-2 is used to identify the high-level rule. As shown, a connection record is associated to a sub-set of a rule (in this case Rule A-1). This is then passed up to the next level of processing where Rule A-1 is used as the base and Rule A-2 is used to complete the access control validation.

The rule library is used in both kernel and user mode for rule checking. When deployed, the rule set will be further divided to facilitate the six levels of security identified above. A connection/block rule set (CBRS) is passed to the verify interface when rule checking is required. The CBRS is part of the control used to identify the state of all "connections." Rule sets are defined in an XML representation and normalized to Directed Graphs in memory for performance. Rules are divided into application and driver subsets and can further be divided based on additional policies. FIG. 13 represents a generalized rule subsystem.

As shown in FIG. 13, the function names are represented only as pseudo code. The rule manager 1300 reads the rule set from XML and divides the rules into the application and driver specific components. The rule manager 1300 tags the relationship rules to allow for a quick determination and processing of a rule set from the point of last validation. Part of the rule manager processing is to read and understand the URL and scanner signatures and to create static rules that may be applied, for example, by an administrator who may want to restrict access to all sex sites. The Rules Manager would read the content filtering URL database and supply synchronous access control rules that would restrict all traffic to these sites. These rules are dynamically created by the Rules Manager periodically to allow the ability to map the correct IP address to the sites. In the case where a sex site IP address changes, the synchronous access control check will not find a match, but the content filtering above (which does a dynamic lookup, i.e., asynchronous operation) on the address will.

As one non-limiting example, the driver will receive a connection packet and apply a filter against the packet. As a filter allow rule or rules are found, the rule or rules are added to the connection block and shared at the next security check. If the next security check is for an application proxy, it will process rule validation from the point where the driver left off, in search for the continuation of the application specific context for the rule.

As has been discussed above, the goal of the authorization system is to drop packets and data streams as soon as possible. The object model for the rules infrastructure is contingent on the layers below it, as each lower layer provides and insures a level of trust to the next upper layers. A single rule may have one or more relationships with each lower level in the case where there are multiple features in a layer.

An advantageous aspect of the invention includes the rule manager that provides, or facilitates, the ability of security components/features to supply dynamic rules for bandwidth management, of IDS gated filtering, etc. The security features that use access control filtering via thresholds are the following:

| Component | Trigger | Benefit |
| --- | --- | --- |
| Content Filtering | Rule manager scans database and creates static allow or deny rules for access control using proxy support "allurls" etc | Circumvents flow reaching URL database lookups in content filtering engine |
| IDS/IPS | Threshold on signature creates allow/deny rules for specific source and protocol | Circumvents flow reaching IDS/IPS engine signature match which may be in application space |
| Anti-spam | Threshold on spam detection creates allow/deny rule for specific source/mail protocol | Circumvents flow reaching SPAM engine lookups which may be in application space |
| Anti-Virus | Threshold on signature creates allow/deny rules for specific source and protocol | Circumvents flow reaching AV engine for scanning |
| Anti-Spyware | Threshold on signature creates allow/deny rules for specific source and protocol | Circumvents flow reaching spyware engine for scanning |
| Proxy | Threshold on protocol violation, anomalies or operational restriction creates allow/deny rules for specific source and protocol | Circumvents flow reaching application level for checking |
| Proxy/SOAP | Threshold or violation in XML SOAP format or XML schema creates allow/deny rules for specific source and protocol | Circumvents flow reaching application level for checking |

-continued

| Component | Trigger | Benefit |
|---|---|---|
| Proxy/P2P | Threshold or restriction on P2P protocol creates allow/deny rules for specific source and protocol (IM/Skype/Kazaa etc) | Circumvents flow reaching application level for checking |

In addition any component may use the rule manager to propagate dynamic rules for both bandwidth management and blacklisting. Also thresholds may be set on dynamic filters above, which may cause access control to create bandwidth rules and bandwidth rules may use thresholds to dynamically create blacklist rules for very severe DOS attacks.

Figure 14:
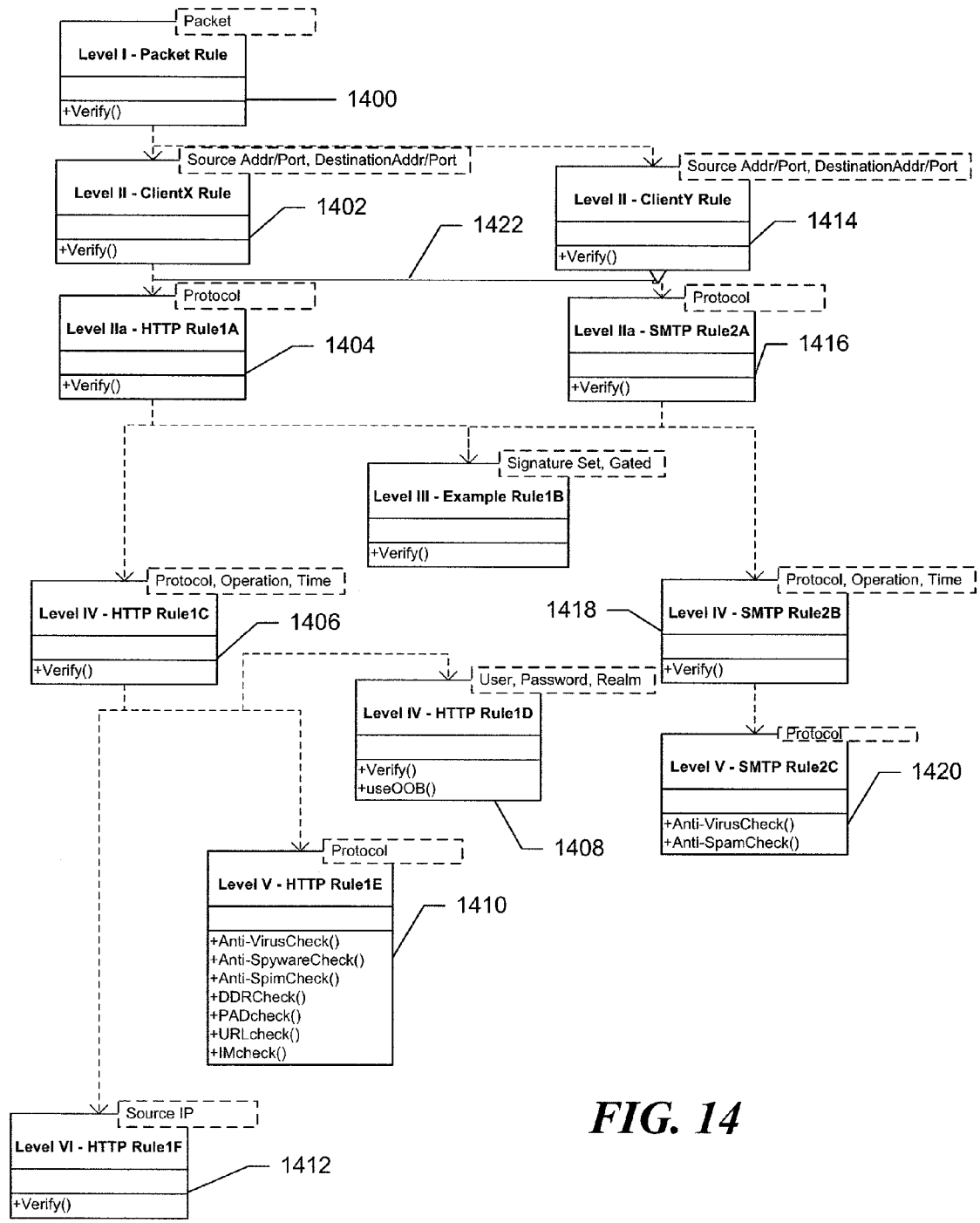
FIG. 14 depicts rules represented in accordance with an embodiment of the present invention.

Further, rules may be bound to specific levels of the security hierarchy. As shown in FIG. 14, an example of three rules is visually presented.

With respect to FIG. 14, the first rule is with regard to a client X communicating to a remote resource HTTP; the second rule is with regard to client Y communicating through a remote resource over SMTP; and the third rule is with regard to client X communicating to the same resource as client Y only over SMTP. As is shown, all rules use a basic packet validation rule 1400 at security level I. Client X is configured to allow traffic from his IP address to any host at security level II, ClientX rule 1402. This is, of course, provided that the host follows the additional security requirements defined at higher security levels. Client X is allowed to use HTTP traffic, provided it is in compliance with HTTP Rule1A 1404. The rule 1404 identifies the requirements for authentication, scanning and client security via HTTP Rule1C 1406, HTTP Rule1D 1408, HTTP Rule1E 1410 and HTTP Rule1F 1412. Returning to clientY, a level II clientY rule 1414 is defined that includes an SMTP Rule2A 1416 that includes a level IV SMTP Rule2B 1418 which includes a Level V SMTP Rule2C 1420 that requires antivirus and anti-spam scanning.

As shown in FIG. 14, client X also has a rule that uses the same policy as clientY for SMTP. This usage of the same rule is represented in the object graph by the solid line 1422 in order to indicate an association of the low level definition of client X with the upper level definition of client Y's use of SMTP.

Referring back to FIG. 1, a first conceptual data flow representative to the present invention involves flow of data from, for example, device 16 through the network 12, the security gateway 10, the router 30 to the network 28 out to a target device 34. The view of this data flow is based on the network relationship, therefore, between the security gateway 10, the requesting resource 16 and the destination resource 34.

There is another data flow and this is with respect to the flow of data through the security gateway 10, i.e., as data passes through the system. The data through the security gateway 10 may take a number of different "paths," where the paths are dependent on the rules and policies defined for that specific data. In general, a path is determined based on the network source resource and network destination resource and the information being passed. As has been described above, rules or policies are identified and control the data flow processing. As the information is processed within the security gateway 10, the data may change paths, based on certain security features. A data flow is normally associated with a specific security requirement that guarantees a level of processing and validation of information as required in order to insure security integrity between the source and destination resource. The security data flow is provided using the security spine, described above. As discussed, there may be multiple security spines implemented within a security gateway 10 and data may recursively flow between security features in a spine and between spines.

Figure 15:
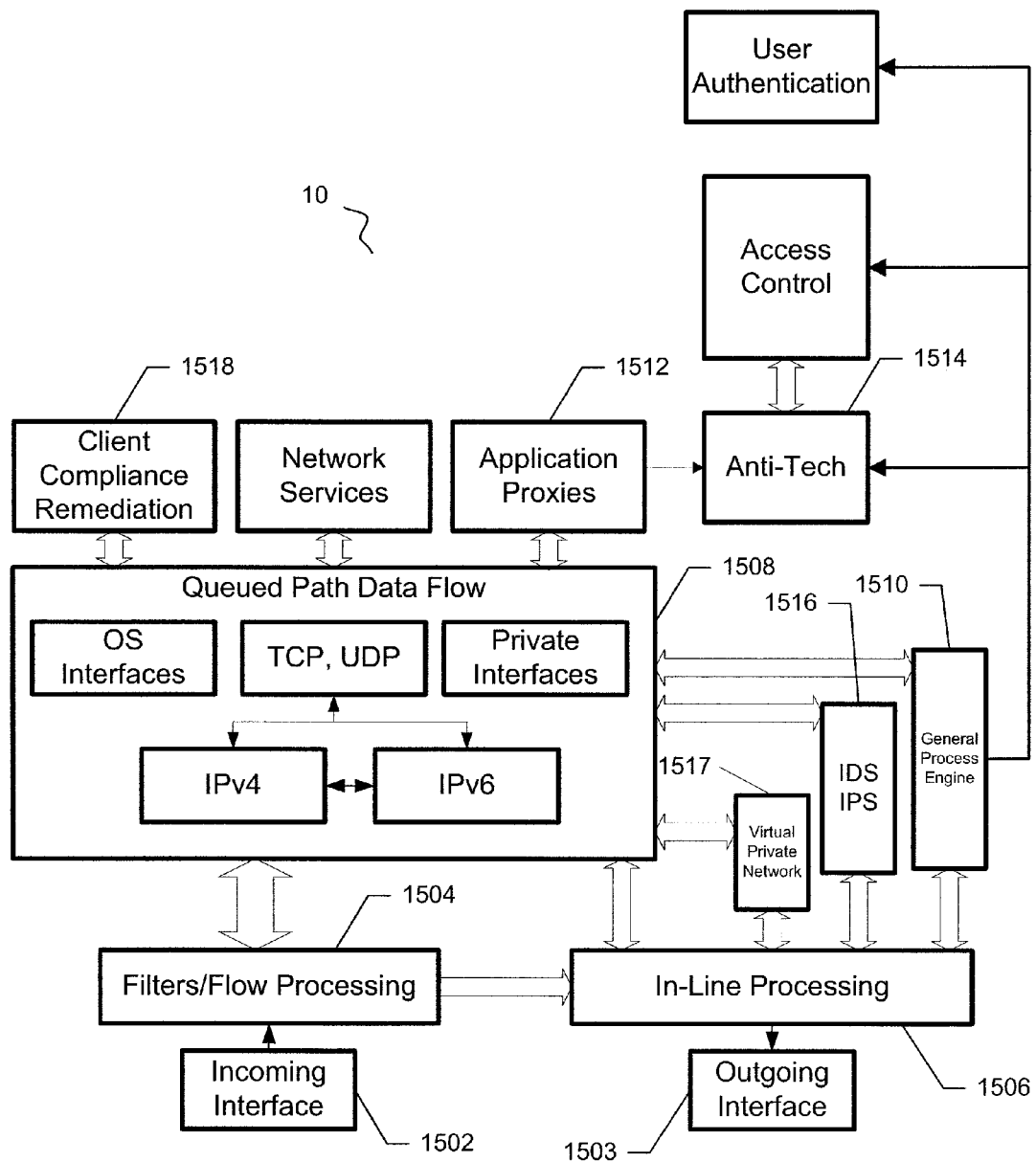
FIG. 15 is a block diagram of in-line and queued path processing according to an embodiment of the present invention.

There are two primary data flows in the security gateway 10: an in-line data flow and a queued path data flow. The in-line data flow is used for processing from start to finish. The queued path data flow handles both security features and the network services. Interfaces are used to move the data stream to and from in-line and queued path processing as represented in FIG. 15.

An incoming interface 1502 is provided to receive the data flow while an outgoing interface 1503 passes the data flow out. A filters/flow processing module 1504 is coupled to the incoming interface 1502 and provides the functionality to identify the specific direction or processing that is required for each individual packet. A packet may be dropped immediately, forwarded to an in-line data stream, or forwarded to a queued path data stream, depending on the rules policies and features that are implemented. An in-line processing module 1506 is coupled to the filter/flow processing module 1504 and provides an implementation of a security spine. The security spine may include a partial or full implementation of the security features listed above.

For in-line processing, packets are processed until a context switch is required or the data cannot be processed any further. Data may flow to and from in-line processing using defined interfaces. The in-line processing includes all of the security processing that can be completed without taking packets out of the active data flow and without changing the order in which they have been processed, with the exception of re-ordering, which may be handled in-line. Security features provided by in-line processing include, but are not limited to, packet validation, packet filtering and IDS scanning.

Queued path processing facilitates the blocking of a data stream that is waiting for additional input such as a security exchange or user authorization. Queued path processing is also associated with any non-critical network activity such as routing updates and DHCP services. Security services provided by queued path processing include, but are not limited to, anti-virus scanning, content filtering and protocol anomaly detection. A queued path packet flow module 1508 may use a number of defined interfaces that allow packets and information to be processed and shared amongst the features. These interfaces include: BSD socket to network interfaces, operating system public interfaces such as device IOCTL requests, and private interfaces defined per application, for example, call back routines.

A general processing engine 1510 is coupled to the in-line processing module 1506 and the queued path data flow module 1508 and provides for scanning a data stream and identifying the starting and ending point of "user" content. This user content can then be passed to a number of security engines such as anti-virus and anti-spam and can be validated to insure that the data stream does not contain malicious content. The general processing engine 1510 is, in one embodiment, a light-weight protocol engine that may not check for protocol compliance to RFCs but does provide application access control, authentication and identify context boundaries.

Applications proxies 1512 facilitate the ability to scan a data stream for both RFC protocol compliance and content boundaries. This content can then be passed to a number of security engines, such as anti-virus and anti-spam, and can be validated to insure that the data stream does not contain malicious content. Conceptually, the applications proxies 1512 are a superset of a general processing engine 1510.

An anti-technology module 1514 provides for one or more content security features. These features include, but are not limited to: anti-virus; anti-spam; anti-spy ware; content filters, URL filters; protocol anomaly detection (PAD); and many others as are provided in the future.

As has been discussed above, each of the in-line and queued path data flows use a security spine that defines a security feature available for that data stream.

The features supported for these data flows are implementation specific.

An IDS/IPS module 1516 provides intrusion detection and intrusion prevention systems to protect the data stream against well-known attacks. IDS/IPS is generally integrated into the processing scheme after packet re-ordering in order to provide complete data stream processing.

A VPN module 1517 provides virtual private network support in order to facilitate integrity and privacy by encrypting a data stream between a tunnel beginning and end point. A VPN solution requires both an in-line path solution for encryption once the security association has been made. The queued path implements the secure key exchange and dynamic associations between two systems.

A client compliance remediation module 1518 will facilitate remediation of clients that are not compliant with necessary security levels. In general, end-point security is delivered using client compliance, i.e., security systems at the client. When a client is not compliant, however, the security gateway will require the clients to remediate or that system will be quarantined until such remediation has been processed.

The streams of data that pass to and through the security gateway 10 are each identified by a unique connection record. This connection record contains the security attributes and flow path that are required for processing.

Figure 16:
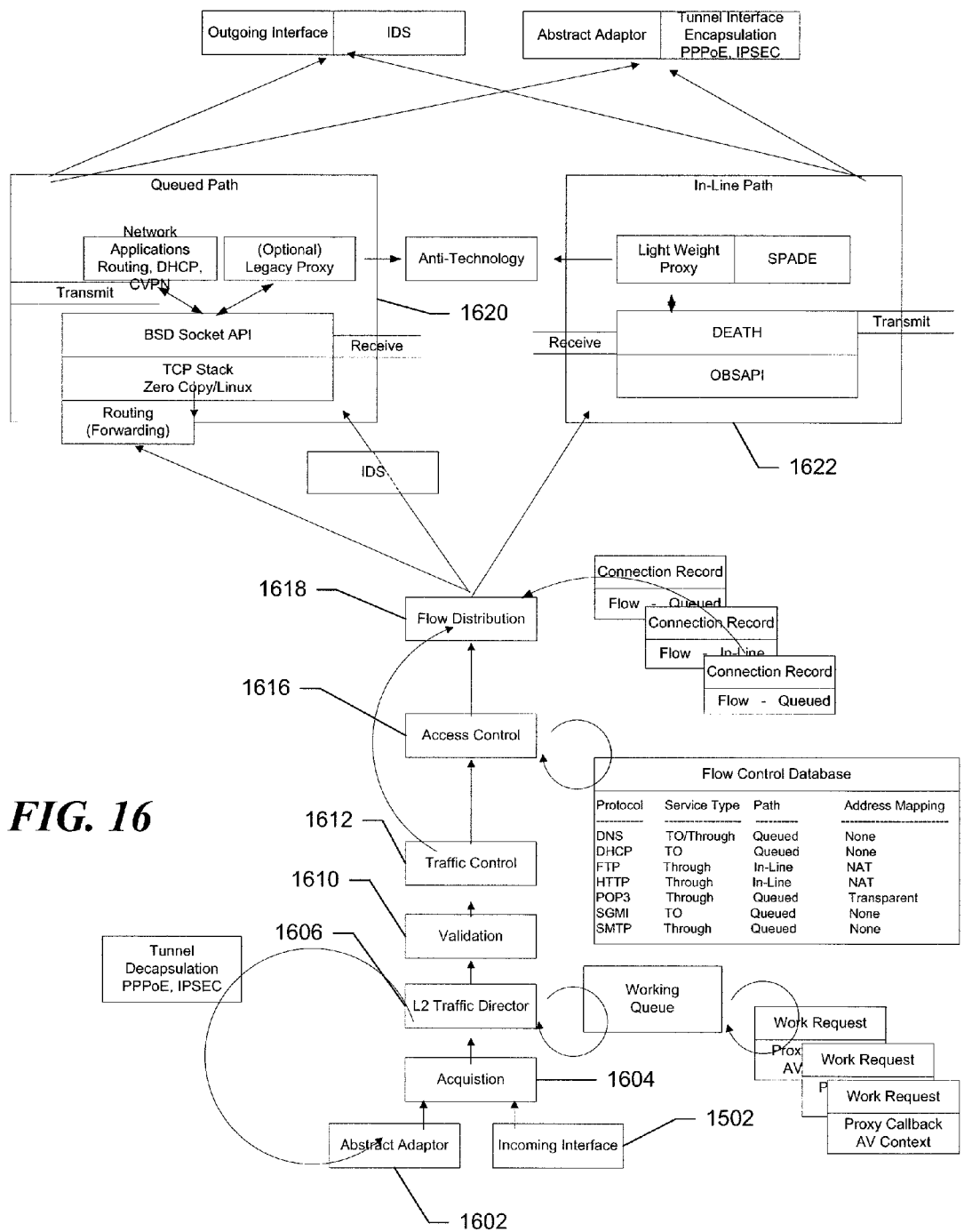
FIG. 16 is a flow chart of data packet processing according to an embodiment of the present invention.

With reference to FIG. 16, packets arrive on the incoming interface 1502 via either Ethernet hardware or an abstract adapter 1602. Packet acquisition software module 1604 obtains the packet from hardware or operating system memory and creates a packet description or associates the packet with an existing packet descriptor for tunnels. An L2 Traffic Director Module 1606 determines if the packet contains an encapsulated payload. If a packet is encapsulated, it is directed to a decapsulation module 1608 for the specific protocol that is being used. These packets, once decapsulated, are reinserted into the data stream using the abstract adapter 1602, which usually is a virtual tunnel adapter. A validation module 1610 validates the packet for CRC checks and security vulnerabilities such as invalid IP options. Traffic control module 1612 prevents Denial of Service attacks to and/or through the security gateway 10. Filters 1614 are provided to prevent known real-time black listed (RBL) clients from accessing the system by inspecting a black/white list. In addition, the filters 1614 insure specific client access where necessary. Forwarding filters may also be implemented if necessary.

An access control function 1616 performs rule look up and determines if a rule applies to the packet. Rules that end up denying a packet cause the packet to be dropped while allow policies result in a connection record being created, and an outgoing interface being assigned if specified by the policy. The outgoing policy will assign an interface if not specified. The flow control database is used to assign the flow attribute for the connection record using a tuple match managing connections both to and through the security gateway 10. Flow attributes may be assigned to, through or both, to/through the security gateway 10. The "to" flow attribute identifies connection to the security gateway using the security gateway IP address. The "through" attribute identifies connections from a client, through the gateway to the remote service. The rule identifier is recorded in the connection record. Security attributes such as anti-virus scanning, intrusion detection services and client compliance may be set in the connection record if specified by the rule.

A flow distribution module 1618 uses the flow attribute to determine the path of the request, that is, in-line or queued path.

The queued path 1620 receives packets using the BSD socket API. Legacy proxies use socket, bind, listen, accept, connection send/write, receive/read, select and close calls to establish a connection and to receive and send application level data. Connections are established to the security gateway proxy and from the proxy to the requested server. Data may be scanned using any of the anti-technologies, for example, anti-virus, anti-spam, content filtering and anti-spy ware. Once validated, data is transmitted to the destination using socket write/send calls. Intrusion detection systems are integrated into the egress interface of communication and the data stream is scanned if required.

For the in-line path 1622, a direct call is made from the flow distribution module 1620 for a data stream reconstruction. The OBSAPI (Ordered Byte Stream Application Programming Interface) allows for the re-assembly of network packets via TCP into a data stream and may be configured to bypass the lightweight process and transmit data to the egress interface automatically. IDS is integrated into the egress interface and may be scanned if enabled for the data stream. If enabled, the lightweight proxy is notified of any incoming data streams using the OBSAPI. The lightweight proxy generally scans the control information of a protocol for content and then passes it to the anti-technology components as required. As has been described above, these technologies include anti-virus, anti-spam, DDR, content filtering and anti-spyware to name a few. The lightweight proxy also supports NAT and fixes up embedded addresses for protocols such as FTP and SIP.

Figure 17:
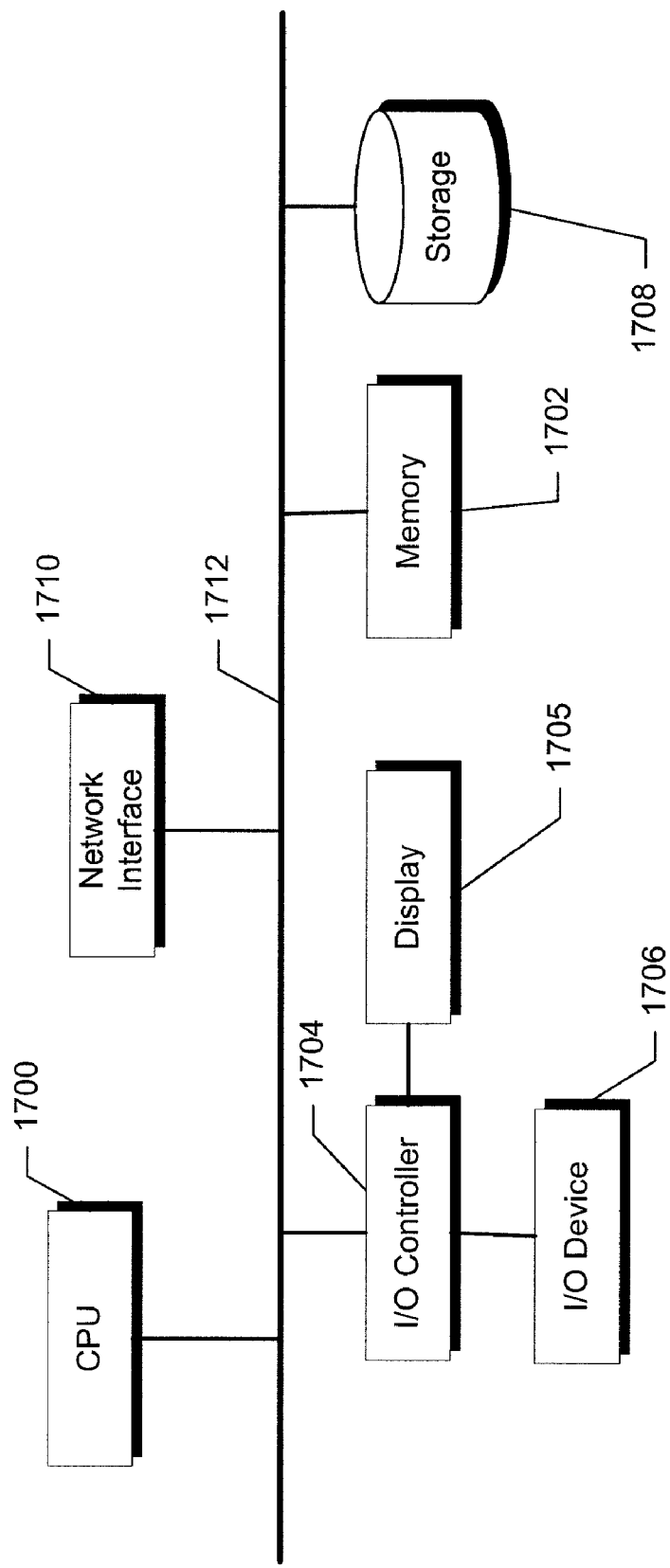
FIG. 17 is a block diagram of a device connected to a network in accordance with one embodiment of the present invention.

Any of the clients, or servers, in addition to the security gateway 10, can be any one of a number of different devices, however, these devices have some components and/or functionality in common irrespective of their relative technical complexities. As shown in FIG. 17, these devices include a central processing unit 1700; a memory 1702; an input/output device or controller 1704 to couple to an IO device 1706, e.g., a keyboard, keypad or touch screen; a mass storage device 1708, e.g., a hard disk drive; and a network interface 1710 for communicating to a network. A bus 1712 couples these devices to one another to allow communication between them. The IO controller 1704 may also be coupled to a display device 1705.

Embodiments of the above-described invention may be implemented in either all software, all hardware, or a combination of hardware and software, including program code stored in a firmware format to support dedicated hardware. A software implementation of the above described embodiment(s) may comprise a series of computer instructions either fixed on a tangible medium, such as a computer readable media, e.g. diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the present invention have been disclosed, it will be apparent to those skilled in the art that changes and modifications can be made which will achieve some of the advantages of the invention without departing from the spirit and scope of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results.

What is claimed is:

1. A method of controlling access to a networked device, the method comprising:
   receiving an incoming message packet by a security gateway coupled to said networked device;
   evaluating the received message packet to determine if the received message packet is compliant with a first test, the first test corresponding to a first level of a security hierarchy implemented by said security gateway,
      wherein the security hierarchy establishes a relationship between security functions from a lowest level to a highest level; and
      the received packet is rejected at the earliest possible operation in the processing of the packet in the security hierarchy;
   forwarding the received packet and an indication of its compliance with the first test for subsequent processing upon the received packet complying with the first test; and
   dropping the received packet whereby no further processing of the received packet is performed upon the received packet not complying with the first test.

2. The method of claim 1, further comprising:
   evaluating the received packet to determine if the received packet complies with a second test, the second test corresponding to a second level of the security hierarchy;
   forwarding the received packet and an indication of its compliance with the second test for subsequent processing upon the received packet complying with the second test; and
   dropping the received packet whereby no further processing of the received packed is performed upon the received packet not complying with the second test,
      wherein the second level is higher than the first level in the security hierarchy, and
      the security hierarchy comprises at least one other security level between the first and second security levels.

3. The method of claim 2, wherein the first level is said lowest level in the security hierarchy.

4. The method of claim 1, wherein the evaluation of the received packet according to the first test is a function of at least one of:
   a source address value;
   a destination address value;
   a source port value;
   a destination port value;
   a network protocol value;
   an incoming interface value;
   an outgoing interface value; and a requested service value.

5. A method of controlling access to a networked device, the method comprising:
   receiving a plurality of incoming message packets by a security gateway coupled to said networked device;
   identifying, at a level of a security hierarchy implemented by said security gateway, a subset of the plurality of incoming message packets as being an attack on the networked device,
      wherein the security hierarchy establishes a relationship between security functions from a lowest level to a highest level;
   determining a plurality of indicator parameters of the identified subset of attacking message packets;
   dynamically defining an attack defense processing rule as a function of the determined plurality of indicator parameters, wherein said attack defense processing rule may be at any level of said security hierarchy; and
   applying the attack defense processing rule to subsequently received incoming message packets to fend off the identified attack.

6. The method of claim 5, wherein identifying the subset of incoming packets as being an attack comprises:
   receiving a predetermined number of access requests for the networked device over a predetermined period of time,
      wherein the access requests have at least one common parameter value.

7. The method of claim 5, wherein the common parameter value is at least one of:
   a source address value;
   a destination address value;
   a source port value;
   a destination port value;
   a network protocol value;
   an outgoing interface value; and
   a requested service value.

8. The method of claim 7, further comprising:
   receiving a new incoming message packet;
   determining if the attack defense processing rule is to be applied to the received new incoming message packet; and
   applying the attack defense processing rule to the new incoming message packet upon said determining if the attack defense processing rule is to be applied finding that the attack defense processing rule should be so applied.

9. The method of claim 8, wherein determining if the attack defense processing rule is to be applied to the new incoming message packet comprises:
   comparing a subset of the plurality of indicator parameter values to corresponding values of the new incoming message packet; and
   if a predetermined number of matches is found, then determining that the attack defense processing rule is to be applied to the new incoming message packet.

10. The method of claim 8, wherein the attack defense processing rule comprises a first test corresponding to a first level of the security hierarchy and a second test corresponding to a second level of the security hierarchy, wherein the security hierarchy comprises at least one other security level between the first and second security levels, the method further comprising:

applying the first test to the new incoming message packet, applying the second test to the new incoming message packet if the first test is passed; and discarding the new incoming message packet if either of the first and second tests is not passed, whereby the new incoming message packet is rejected at the earliest possible operation in the processing of the packet in the security hierarchy.

11. The method of claim 10, wherein the first level is the lowest level in the security hierarchy.

12. The method of claim 10, wherein the second level is higher than the first level in the security hierarchy.

13. A method of controlling access at a networked device, the method comprising:

identifying a type of access to be controlled by a security gateway coupled to said networked device; and generating an access control rule applicable to the identified access type, wherein the generated access control rule comprises two portions, each portion corresponding to a level of a security hierarchy implemented by said security gateway; and the security hierarchy establishes a relationship between security functions from a lowest level to a highest level.

14. The method of claim 13, wherein generating the access control rule comprises:

analytically breaking down the access control rule into:

a first portion corresponding to a first level of the security hierarchy; and a second portion corresponding to a second level of the security hierarchy, wherein the second level is higher than the first level in the security hierarchy, and the security hierarchy comprises at least one other security level between the first and second security levels.

15. The method of claim 14, wherein the first level is the lowest level in the security hierarchy.

16. The method of claim 14, wherein:

the first portion is a first test; and the second portion is a second test that provides more security scanning than the first test.

17. The method of claim 16, wherein the first test is one of:

a packet filtering test; and a test that scans a set of security attributes associated with lower levels of the Opens Systems Interconnection(OSI) model.

18. The method of claim 16, wherein the second test is one of:

a URL scanning test; and a test that scans a set of security attributes associated with higher levels of the Opens Systems Interconnection (OSI) model.

19. The method of claim 16, wherein:

the second test is at an applications layer of the Opens Systems Interconnection(OSI) model and is a function of a least one of a protocol identifier and a resource identifier.

* * * * *